United States Patent
Walsh et al.

(10) Patent No.: US 10,089,587 B1
(45) Date of Patent: *Oct. 2, 2018

(54) BUDGET PLANNER FOR SOFTLINES

(71) Applicant: Amazon Technologies, Inc., Seattle, WA (US)

(72) Inventors: Paul J. Walsh, Seattle, WA (US); Paul J. Gardner, Shoreline, WA (US); Lars H. Liden, Seattle, WA (US); Samuel Y. Donnelley, Auburn, WA (US); Graham T. Rosser, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 352 days.

This patent is subject to a terminal disclaimer.

(21) Appl. No.: 14/882,279

(22) Filed: Oct. 13, 2015

Related U.S. Application Data

(63) Continuation of application No. 13/160,462, filed on Jun. 14, 2011, now Pat. No. 9,189,816.

(51) Int. Cl.
| | | |
|---|---|---|
| *G07B 17/00* | (2006.01) | |
| *G07F 19/00* | (2006.01) | |
| *G06Q 10/06* | (2012.01) | |
| *G06Q 40/00* | (2012.01) | |

(52) U.S. Cl.
CPC ....... *G06Q 10/06315* (2013.01); *G06Q 40/12* (2013.12)

(58) Field of Classification Search
None
See application file for complete search history.

(56) References Cited

U.S. PATENT DOCUMENTS

| | | |
|---|---|---|
| 6,980,966 B1 | 12/2005 | Sobrado et al. |
| 7,092,929 B1 | 8/2006 | Dvorak et al. |
| 7,302,405 B2 | 11/2007 | Hoskin et al. |
| 7,333,996 B2 | 2/2008 | Berry et al. |
| 7,555,451 B2 | 6/2009 | Rugge et al. |
| 7,657,471 B1 | 2/2010 | Sankaran |
| 7,668,779 B2 | 2/2010 | DeWitt et al. |

(Continued)

OTHER PUBLICATIONS

U.S. Appl. No. 13/160,462, "Final Office Action", dated Mar. 28, 2013, 13 pages.

(Continued)

*Primary Examiner* — Fateh M Obaid
(74) *Attorney, Agent, or Firm* — Kilpatrick Townsend & Stockton LLP

(57) ABSTRACT

Various approaches described herein enable various types of users, such as finance managers, vendors, and vendor managers to access up-to-date information in a retail environment that can assist with obtaining and tracking various items to be offered through that environment. A budget planner can analyze information such as historical performance, projection, and vendor data to establish a budget plan for various providers for a particular period. The budget information is fed to an assortment planner, which can use similar and other types of information to allocate that budget across various types and styles of item for each provider. A commitment tracker enables a user to commit to at least some portion of the allocation for various items, and track how well the orders are filled. Information at each level is fed back into the system to be almost instantly available and to adjust allocations for current or future periods.

19 Claims, 13 Drawing Sheets

(56) References Cited

U.S. PATENT DOCUMENTS

| | | |
|---|---|---|
| 7,738,984 B2 | 6/2010 | Denton et al. |
| 7,792,704 B2 | 9/2010 | Harding et al. |
| 7,801,753 B2 | 9/2010 | Vemula et al. |
| 7,805,335 B2 | 9/2010 | Wittmer et al. |
| 7,805,382 B2 | 9/2010 | Rosen et al. |
| 7,813,949 B2 | 10/2010 | Grendel et al. |
| 7,813,961 B2 | 10/2010 | Wittmer et al. |
| 7,831,487 B2 | 11/2010 | Abo-Hasna et al. |
| 7,853,491 B2 | 12/2010 | Wittmer et al. |
| 7,870,012 B2 | 1/2011 | Katz et al. |
| 7,882,088 B2 | 2/2011 | Veit |
| 7,895,353 B2 | 2/2011 | Jansson |
| 8,046,273 B2 | 10/2011 | Welter et al. |
| 8,050,956 B2 | 11/2011 | Abo-Hasna et al. |
| 8,055,532 B2 | 11/2011 | Min et al. |
| 8,209,236 B2 | 6/2012 | Stone et al. |
| 8,301,554 B2 | 10/2012 | Simpson et al. |
| 8,401,928 B2 | 3/2013 | Herrmann et al. |
| 8,423,428 B2 | 4/2013 | Grendel et al. |
| 2002/0069096 A1 | 6/2002 | Lindoerfer et al. |
| 2002/0073114 A1 | 6/2002 | Nicastro et al. |
| 2002/0116241 A1 | 8/2002 | Sandhu et al. |
| 2002/0120533 A1 | 8/2002 | Wiesenmaier |
| 2002/0133368 A1 | 9/2002 | Strutt et al. |
| 2003/0018492 A1 | 1/2003 | Carlson |
| 2003/0023499 A1 | 1/2003 | Das et al. |
| 2003/0187767 A1 | 10/2003 | Crites et al. |
| 2003/0233294 A1 | 12/2003 | Luo et al. |
| 2004/0044544 A1 | 3/2004 | Smith et al. |
| 2004/0064389 A1 | 4/2004 | Force et al. |
| 2004/0083119 A1 | 4/2004 | Schunder et al. |
| 2004/0172321 A1 | 9/2004 | Vemula et al. |
| 2004/0186791 A1 | 9/2004 | Fuisz et al. |
| 2004/0220861 A1 | 11/2004 | Morciniec et al. |
| 2005/0071376 A1 | 3/2005 | Modi |
| 2005/0144125 A1 | 6/2005 | Erbey et al. |
| 2005/0197913 A1 | 9/2005 | Grendel et al. |
| 2005/0197915 A1 | 9/2005 | Biwer et al. |
| 2005/0235020 A1 | 10/2005 | Gabelmann et al. |
| 2005/0246240 A1 | 11/2005 | Padilla |
| 2005/0251433 A1 | 11/2005 | Orifici et al. |
| 2006/0149687 A1 | 7/2006 | McLemore |
| 2006/0190391 A1 | 8/2006 | Cullen et al. |
| 2006/0229896 A1 | 10/2006 | Rosen et al. |
| 2008/0027861 A1 | 1/2008 | Gendler |
| 2008/0201196 A1 | 8/2008 | Rowland |
| 2008/0300933 A1 | 12/2008 | Britton et al. |
| 2009/0204529 A1 | 8/2009 | Warsaw et al. |
| 2009/0216656 A1 | 8/2009 | Cerimeli |
| 2010/0106680 A1 | 4/2010 | Navarrete et al. |
| 2010/0138264 A1 | 6/2010 | Faris et al. |
| 2010/0217712 A1 | 8/2010 | Fillmore |
| 2010/0223386 A1 | 9/2010 | Kokusho et al. |
| 2011/0125625 A1 | 5/2011 | Dalal et al. |
| 2011/0295763 A1 | 12/2011 | Chen et al. |
| 2011/0302047 A1 | 12/2011 | Erbey et al. |
| 2012/0084090 A1 | 4/2012 | Woodard et al. |
| 2012/0173384 A1 | 7/2012 | Herrmann et al. |
| 2012/0259675 A1 | 10/2012 | Roehrs et al. |
| 2013/0246237 A1 | 9/2013 | Dyess et al. |

OTHER PUBLICATIONS

U.S. Appl. No. 13/160,462 , "Non Final Office Action", dated Jun. 27, 2012, 10 pages.

U.S. Appl. No. 13/160,462 , "Non Final Office Action", dated Apr. 24, 2012, 11 pages.

U.S. Appl. No. 13/160,462 , "Non final office action", dated Sep. 17, 2014, 11 pages.

U.S. Appl. No. 13/160,462 , "Non-Final Office Action", dated Jan. 15, 2015, 4 pages.

U.S. Appl. No. 13/160,462 , "Notice of Allowance", dated Aug. 5, 2015, 7 pages.

U.S. Appl. No. 13/160,462, filed Jun. 14, 2011, Titled: Budget Planner for Softlines.

U.S. Appl. No. 13/160,463, filed Jun. 14, 2011, Titled: Assortment Planner for Softlines.

Kumar et al., "A Fuzzy Goal Programming Approach for Vendor Selection Problem in a Supply Chain", Computers & Industrial Engineering, vol. 46 (Mar. 2004), pp. 69-85.

Padovani et al., "Managing high-risk outsourcing" (2005), 6 pages.

Roodhooft , Filip, "Vendor selection and ealuation: an activity based costing appraoch" (1995), 15 pages.

Silver , Edward, "Research in inventory management: a review and critique", *Operations Research* 29(4) (1981), pp. 628-645.

Fall 2012 Commitment Tracker– Vendor A

Shoes: Womens: Running: Style A: White

| Size | Allocation | Utilized | Available | Purchased | Request |
|---|---|---|---|---|---|
| 4 | $25,000 | $19,786 | $5,214 | | |
| 5 | $25,000 | $12,274 | $12,726 | | |
| 6 | | | | | |
| 6.5 | | | | | |
| 7 | | | | | |
| 7.5 | | | 1306 | | |
| 8 | 1302 | 1304 | | | |
| ... | | ... | | | |

Submit

FIG. 13

Fall 2012 Commitment Tracker by Vendor

Shoes: Womens: Running: White

| Vendor | Allocation | Utilized | Available | Purchased | Request |
|---|---|---|---|---|---|
| A | $225,000 | $186,743 | $ 38,257 | | |
| B | $200,000 | $ 27,084 | $172,916 | | |
| C | | | | | |
| D | | ... | | | |
| E | | | | | |
| F | | | | | |
| G | | | | | |
| ... | | ... | | | |

Submit

Purchase Order Tracker - Summer 2012 – Vendor A

| Invoice # | Commitment | Fulfilled | Outstanding | Notes | |
|---|---|---|---|---|---|
| 682024 | 785 | 735 | 50 | Delay in shipping | Cancel |
| 692342 | 300 | 300 | 0 | | |
| 700234 | 1,005 | 0 | 1,005 | Ship date 6/12/2012 | Cancel |
| 718374 | 250 | 0 | 250 | PO issues 7/1/2012 | |

BUDGET PLANNER FOR SOFTLINES

CROSS-REFERENCE TO RELATED APPLICATIONS

This application is a Continuation of U.S. patent application Ser. No. 13/160,462, entitled "Budget Planner for Softlines," filed Jun. 14, 2011, which is related to co-pending U.S. patent application Ser. No. 13/160,463, entitled "Assortment Planner for Softlines," filed Jun. 14, 2011, and co-pending U.S. patent application Ser. No. 13/160,466, entitled "Commitment Tracker for Softlines," filed Jun. 14, 2011, the contents of all of which are hereby incorporated herein by reference in their entireties.

BACKGROUND

Conventional approaches to purchasing items to offer to customers rely heavily on manual budgeting and planning, without a standardized process that works across various categories of items. In particular, types of items that fall under a retail "soft lines" category or product line, which can include items such as apparel, watches, jewelry, footwear, and sporting goods, are often handled inconsistently even across the same department of a retailer. For example, there can be many different buyers for an apparel category who, for each season, have to set or obtain a fixed budget, then manually allocate that budget over the various types or styles of item that the buyer thinks will sell well during a particular season. The person allocating the budget will generally set an amount for a vendor or category of item, but will not set budgets for particular styles within that category or for that vendor. Thus, even when the buyer has printouts or spreadsheets with various budgeting numbers or other such information, the buyer must attempt to allocate the budget over the styles that the buyer thinks will do well based upon a "touch and feel" approach the buyer gets at a fashion show, vendor presentation, etc. Since each buyer will have different tastes and preferences, the budget will be allocated differently among the various buyers. There is currently no way to determine and update budgets and allocations at these various levels of granularity in real time based upon current data, and enable buyers, vendors, and other such entities to access, query, and update that information in the field as needed. Further, there is no centralized way to ensure that the approaches to budgeting and allocations are applied consistently across various product lines or types of item, or across periods of time for the same product line or type of item.

BRIEF DESCRIPTION OF THE DRAWINGS

Various embodiments in accordance with the present disclosure will be described with reference to the drawings, in which:

FIG. 13 illustrates an example interface illustrating how commitments for various allocations can be viewed, adjusted, or updated by parameter in accordance with various embodiments;

FIG. 14 illustrates an example interface illustrating how commitments for various allocations can be viewed, adjusted, or updated by vendor in accordance with various embodiments;

FIG. 15 illustrates an example interface illustrating how the status of various purchase orders or other commitments can be tracked in accordance with various embodiments;

DETAILED DESCRIPTION

Systems and methods in accordance with various embodiments of the present disclosure may overcome one or more of the aforementioned and other deficiencies experienced in conventional approaches to acquiring items (e.g., products or services) to be offered for consumption (e.g., purchase, rent, lease, or download) by an entity such as an electronic retailer. In particular, various embodiments utilize a system or service that provides budgeting, allocation, and commitment tracking across various types of item from various sources in a way that is consistent, or at least standardized, in at least some aspects. Such a system can enable various entities, such as buyers or vendors, to access the system at any time from any appropriate location to perform tasks such as to access current information, run queries on specific parameter combinations, update or request various adjustments, etc. Such a system can also utilize various data sources, such as historical performance data, market projections, and vendor information, to generate budgets and allocations in a relatively standardized way across multiple dimensions of data.

Figure 1:
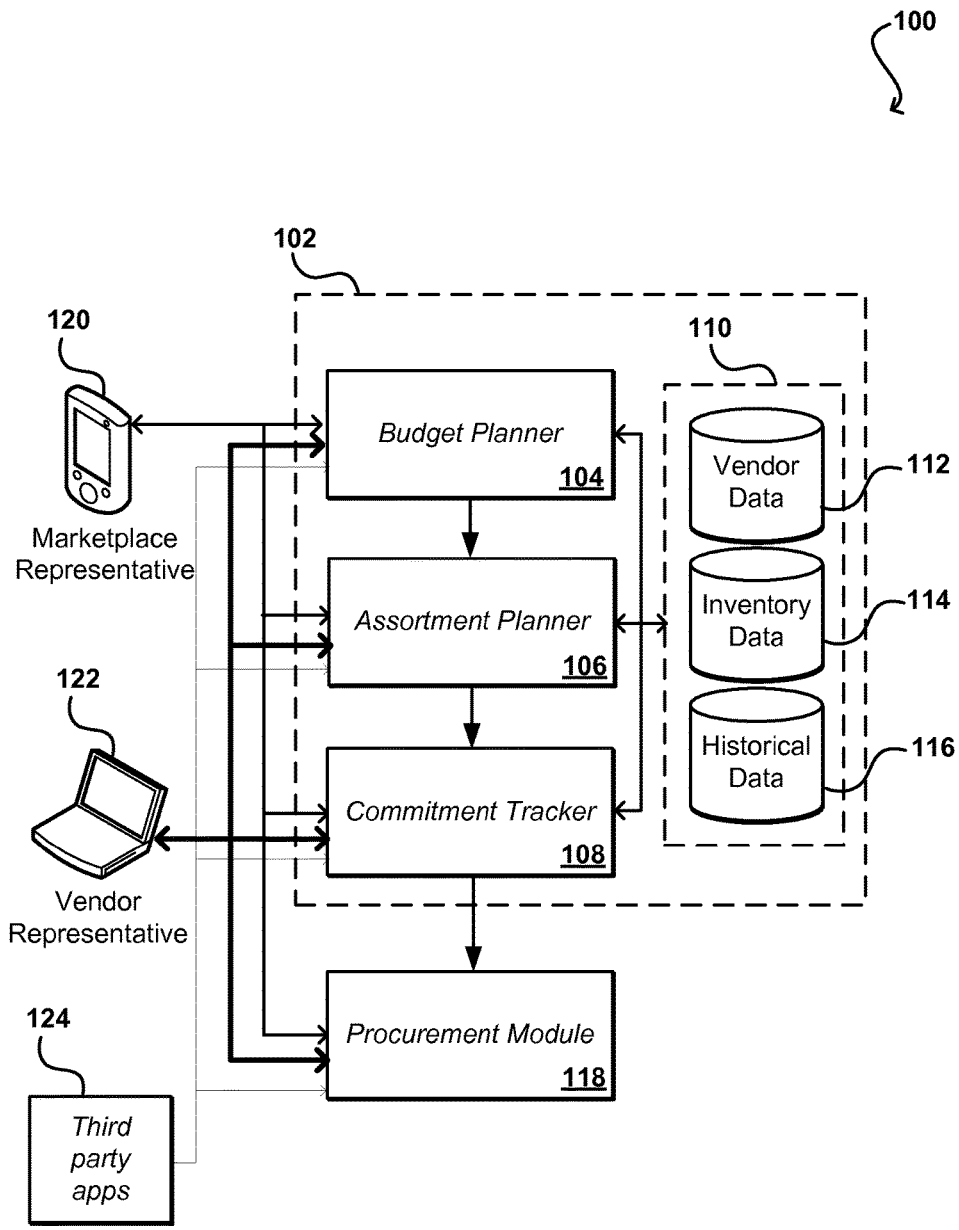
FIG. 1 illustrates an example of a system that can be used to budget, allocate, and track commitments for the acquisition of various items in accordance with various embodiments.

For example, FIG. 1 illustrates an example overview 100 of a retail planning and management system 102 (hereinafter referred to as the "management system") that can be used in accordance with various embodiments. The system can be accessed by any appropriate and/or authorized user or entity, such as may include a retailer or marketplace representative 120, a vendor representative 122, a third party application 124, or other such users of the management system. In this example, the system includes four main components: a budget planner 104, an assortment planner 106, a commitment tracker 108, and a data warehouse 110. It should be understood that these components can be implemented using separate or common devices in one or more locations, and may be distributed across multiple instances in various embodiments. The example also includes a procurement module 118, which can be part of, or separate from, the management system 102. In this example, the budget planner will generally perform functions such as to analyze various types of data, as may include vendor data 112, inventory data 114, and historical data 116 stored to the data warehouse 110 from any of a plurality of sources, in order to generate budgets to be used for a particular buying period, such as an upcoming season for a category of items. These pre-order budgets can be allocated across a number of different categories or entities, such as a budget per category or sub-category of item (e.g., shoes) or a budget per vendor (e.g., a producer, manufacturer, distributor, or source of one or more brands of shoes). This budget information can be accessed by any appropriate party, such as an authorized electronic marketplace representative (e.g., a finance manager or category manager) in charge of maintaining the budget or finances for one or more aspects of the electronic marketplace.

The budget information can be passed into the assortment planner 106. The assortment planner is operable to examine additional information, such as performance data for particular sizes, styles, or colors, as well as vendor marketing information, etc., to attempt to allocate that budget over various types of item in a way that is consistent across the various categories. For example, a retailer might want to use an algorithm that maximizes for profit, selection, popularity, or other such aspects, as well as various weighted combinations of these aspects. The assortment planner can take the budget for a given vendor in a given category, for example, and allocate that budget across the available items in that category as determined by the purchasing algorithm(s). For example, the assortment planner might allocate a first amount to men's dress shoes of a certain size, style, color and a second amount to men's dress shoes of the same style and color, but a different size, etc. A person such as a buyer or vendor representative 122 can access the system to obtain information about the allocations, such that the buyer can have a better idea of the number of items of a particular type or style to buy, and the vendor can determine the areas in which buyers will have the most interest. In addition, a buyer can enter information about the actual amount purchased of a certain item, and can request more or less budget to be allocated for items of that type. As this information is entered into the system, the allocation data can be updated in real time. Further, in at least some embodiments the allocation can be adjusted based upon the actual amounts and/or items purchased in various categories.

Once the allocation has been set and the buyers (or other entities) have decided how and where to spend their allocated budget, the commitment tracker 108 can enable the user to specify various commitments, communicate those commitments to an appropriate party, and monitor or track how those commitments are being processed. For example, an in-stock manager of the marketplace might access the system to see if all of the items of a certain type have been delivered, and whether there are more on the way. A vendor manager might access the system to determine whether a given vendor is behind on its commitments for any type of product. In at least some embodiments, authorized entities can cancel or adjust commitments that have not yet been fulfilled, can request returns, etc. In at least some embodiments, the commitment tracker can include, or work with, a purchase order (PO) tracker that can track commitments to the individually placed order. The commitment tracker can work with at least one procurement module 118 that is operable to work with various vendor systems to obtain the items, such as by transferring order and payment information, tracking quantities, placing recurring orders, etc.

These and other aspects of the various systems and modules will be described in more detail below with respect to the various figures.

Figure 2:
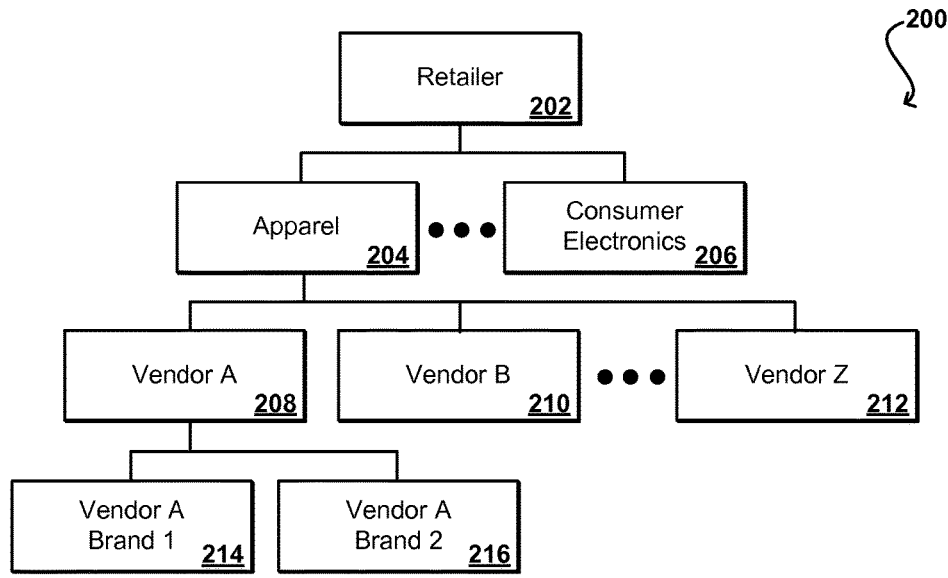
FIG. 2 illustrates an example of a hierarchy including vendors for certain categories across which budget can be allocated in accordance with various embodiments.

In one embodiment, a budget planner portion of the system can rely upon data stored for a number of different categories, vendors, and other such aspects. FIG. 2 illustrates an example of a hierarchical categorization tree 200 that might be used by a retailer 202 or other such entity to classify types of items and track vendors from whom those types of items can be obtained. The information for this tree can be input or selected using any appropriate mechanism, and the tree can span multiple categories or product lines. In this example, an upper level of the tree includes categories of items, such as apparel 204 and consumer electronics 206. For each of these categories, there can be one or more vendors listed, which might include current vendors, possible vendors, approved vendors, etc. In this example, there are a number of vendors 208, 210, 212 who supply apparel items to the retailer. For at least some of those vendors there might be sub-vendors, brands, or divisions 214, 216, or at least different accounts, such as Gap, Gap Kids, and Baby Gap. There also can be one or more levels of subcategories in various embodiments.

As mentioned, the retailer can determine an overall budget for an upcoming year, season, or other such period. This overall budget can be determined based upon any of a number of factors as known in the art, such as profits, projections, rate of sales, etc. In some embodiments, the overall budget can be set and entered into the budget planner as a starting point. In other embodiments, the budget planner can analyze various types of historical and performance data, for example, to determine budgets for each of a variety of categories, vendors, or other such groupings, which then can be totaled to arrive at an overall budget for the retailer, or other such entity, for the upcoming period.

In one example, the budget planner could look at the historical performance of each of the vendors, along with the profitability those vendors, to assign a budget amount to each vendor. By aggregating those budget amounts, the system can arrive at the total budget. In another embodiment, the budget planner can look at data such as sales, performance, and projection data to generate a total, target, or maximum budget to spend for an upcoming season. Then, based at least in part upon vendor performance, rankings, or other such factors, the system can allocate portions of that budget to the various vendors. A primary goal of budget planning in many cases is to split the preorder volume for a given category for an entire season between the various vendors in that category, while providing the capability to reserve a percentage of the total budget for new brands, new vendors, and other such aspects. It can be desirable in many situations to get away from the manual template and process-based approach to budget planning.

Figure 3:
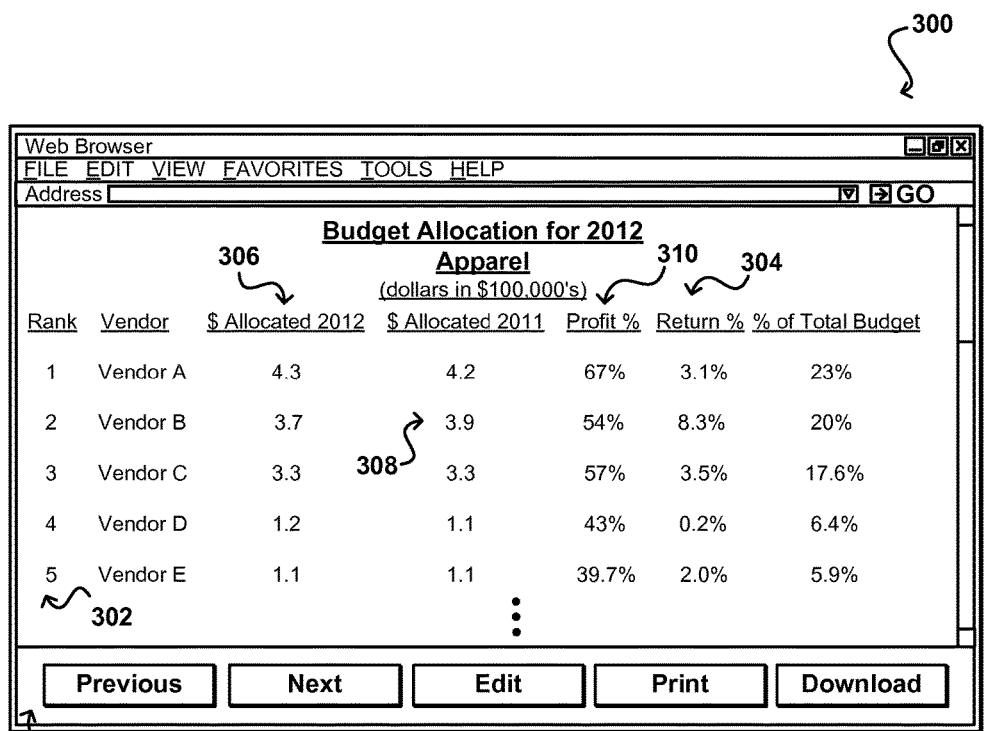
FIG. 3 illustrates an example interface providing sortable ranking of vendor information with past performance data and current budget allocations that can be accessed by a system user in accordance with various embodiments.

FIG. 3 illustrates an example of an interface page 300 that can be displayed to a user accessing the budget planner in accordance with one embodiment. While a Web page is displayed in a browser in this application, it should be understood that this is merely an example and that other interfaces of other types of application can be utilized as well within the scope of the various embodiments. In this example it can be seen that there are a number of vendors listed that are ranked according to one or more criteria, such as past performance, profitability, sales volume, etc. A vendor's ranking can fluctuate between seasons based upon performance during a prior season, as well as trending over time that might include various weightings or decays on the respective values. Vendors can be ranked by any of a number of vendor criteria, such as may include revenue, profitability, and/or any of a number of other such vendor parameters. The attributes can also be weighted for various vendors, regions, categories, etc. For example, weighting for one ranking algorithm can specify a 60% weighting for revenue, 20% for contribution margin, and so on. Scores can be applied for each attribute ranking, which can be combined with the relevant weightings. While in this example the vendors are sorted by rank 302, it should be understood that the vendors could be sorted on any of these other parameters as well, such as the percentage of returns 304.

An authorized user, such as a finance manager, can access the system to obtain current and projected budget information for each vendor. The user can be authorized using any appropriate process known or used in the art for such purposes. The vendor manager can query the data to obtain any appropriate information, such as the profitability of various vendors, trends in profitability by vendor, etc. In this example, the user can view at least some historical data, such as to compare the current allocation with a past allocation and view the historical rates of profitability 310 and returns 304. The user can be presented with a number of different options 312 as well, such as to print or download the data or current report, or to edit or adjust various information. For example, the finance manager might look at the low return percentage of Vendor D and decide to increase the percentage of the total budget allocated to Vendor D. In some embodiments, the system can decrease the other vendors proportionally or equally to make up for the added percentage for Vendor D. In other embodiments, the system might ask the user which other Vendor(s) that percentage should be taken from. In still other embodiments, the increase will cause the bidding planner to automatically recalculate the other percentages based upon the input value. For example, if Vendor D only sells shoes, then the system might take that budget away from other shoe vendors, vendors who sell the same style, or other apparel vendors. The decisions might be made based on profitability or other such factors, which can be recalculated after the manual adjustment. Further, the ability to download and upload specific portions of the data can enable a user to access and/or work with the data in situations where a network connection might not be available, such as when the user is on a plane or in a conference room, etc.

In at least some embodiments, there might be a limit on the extent a user can attempt to change a number. For example, there might be a fixed cap such as +/−3% that a user can change a value. In other embodiments, the net impact on profitability, net sales, or another such aspect can be used to limit the amount of adjustment. For example, if a finance manager thinks that Vendor A is going to have a great year based on their upcoming marketing campaign, the finance manager might attempt to significantly increase the amount of budget allocated to that vendor. If, however, that vendor has low profit margins and adjusting beyond a certain level would reduce the projected profitability below a set target, the system may not let the user adjust beyond that level, at least not without approval. In some cases, the user can have the opportunity to query more profitable vendors, as discussed above, and increase the allocation to those vendors as well in order to balance out the less profitable adjustment. Various other options can be utilized as well within the scope of the various embodiments.

In some cases, there might not be data for new vendors or one-off vendors, or enough data from previous seasons, to assign a value to a vendor based on current criteria. In at least some embodiments, the system can attempt to utilize information for similar or equivalent vendors in order to project an acceptable budget allocation for that vendor. For example, the system might look to a vendor that sells a similar selection of styles, or items with substantially similar attributes, to attempt to predict the performance of a particular vendor. In other embodiments, the system might look at other items purchased by customers purchasing items from that vendor. For example, if a vendor sells shoes to customers who always buy very expensive designer jeans and handbags, the system might decide to set the budget based on a lower volume but higher profit margin model. Various other approaches to predicting performance can be used as well, as may rely on any of the various types of data discussed or suggested herein.

In at least some embodiments, the budget allocations can be based at least in part upon information and/or suggestions from the vendors themselves. For example, a vendor can provide information about which lines or products will be incorporated into an advertising campaign in the upcoming season, which items will be involved in product placement in movies and television shows, etc. In some embodiments, a vendor might be able to provide goals for certain items, such as to grow their share of the market for certain types of items, and might be able to provide lower prices upon guarantees of certain increases in budget or volume. For example, a vendor of an item of clothing that might traditionally not have sold well but will be worn by a character in a summer blockbuster might receive a higher allocation for the upcoming season.

A benefit of such a system is that common criteria and/or algorithms can be applied across any or all categories of a retailer, or other such entity, in an automated fashion. Such an approach can provide consistency and uniformity across a scale (e.g., millions) of products that would be virtually impossible to provide using a manual conventional system with multiple decision makers and no ability to obtain live updates and/or real time data. Further, as will be discussed in more detail later herein, the other components of the system can feed back into the budget planner to improve not only projections for future periods, but also make real-time adjustments to allocations for the current buying season.

In some embodiments, a user can have the ability to utilize an application on a portable device, such as a smart phone, notebook, or tablet computer, to access the data from any appropriate location, such as when at a trade show or when on site with a vendor. The user in at least some embodiments can download a portion of the data to a local data store on the device in order to query and/or manipulate the data, and then upload any changes, requests, or additions to the system. In some embodiments, any changes uploaded to the system can be automatically propagated to the other appropriate components, data stores, user devices, etc. For example, a finance manager might find out that a vendor is going out of business or will only be producing a limited number of items. If that finance manager enters into the application on the portable device that the budget for that vendor should be decreased, that information can be uploaded to the system, whereby the budget planner can update the data and, where appropriate, update the projections and/or allocations based upon the updated data. In at least some embodiments where the allocation for a given vendor increases as a result of a change, a finance manager, vendor manager, buyer, or other appropriate person can be notified of the increase such that the person can take advantage of the additional budget as soon as it is available, and will not rely upon a previously reported budget that is now out of date, as in conventional systems.

Similarly, a vendor manager on site with a vendor might look at the upcoming product line and determine that the products are of a lower quality, have changed their target market, or have otherwise become potentially less desirable than earlier lines. By having access to the system on a portable device the vendor manager can instantly adjust the amount of budget allocated to that vendor, and in at least some embodiments can suggest that the budget be shifted to a competing vendor. In some embodiments, the budget planner will look at other vendors offering those styles or items and shift at least some of the budget to those vendors, at least as long as various other criteria or targets are met. Similarly, if the products are more desirable than past lines the manager might be able to request an increase on the spot. Such information typically would be isolated and hard to obtain using existing approaches, and even though one person decided not to buy as many of a certain type of item from a vendor, the other users of the system might not learn of the change until after the buying season was already over, or may not know how to apply that additional budget effectively to other areas. A system such as is described herein can provide a cross-view of information across the entire retail environment, and automatically adjust information for users according to the criteria and algorithms set in place for the various vendors.

Figure 4:
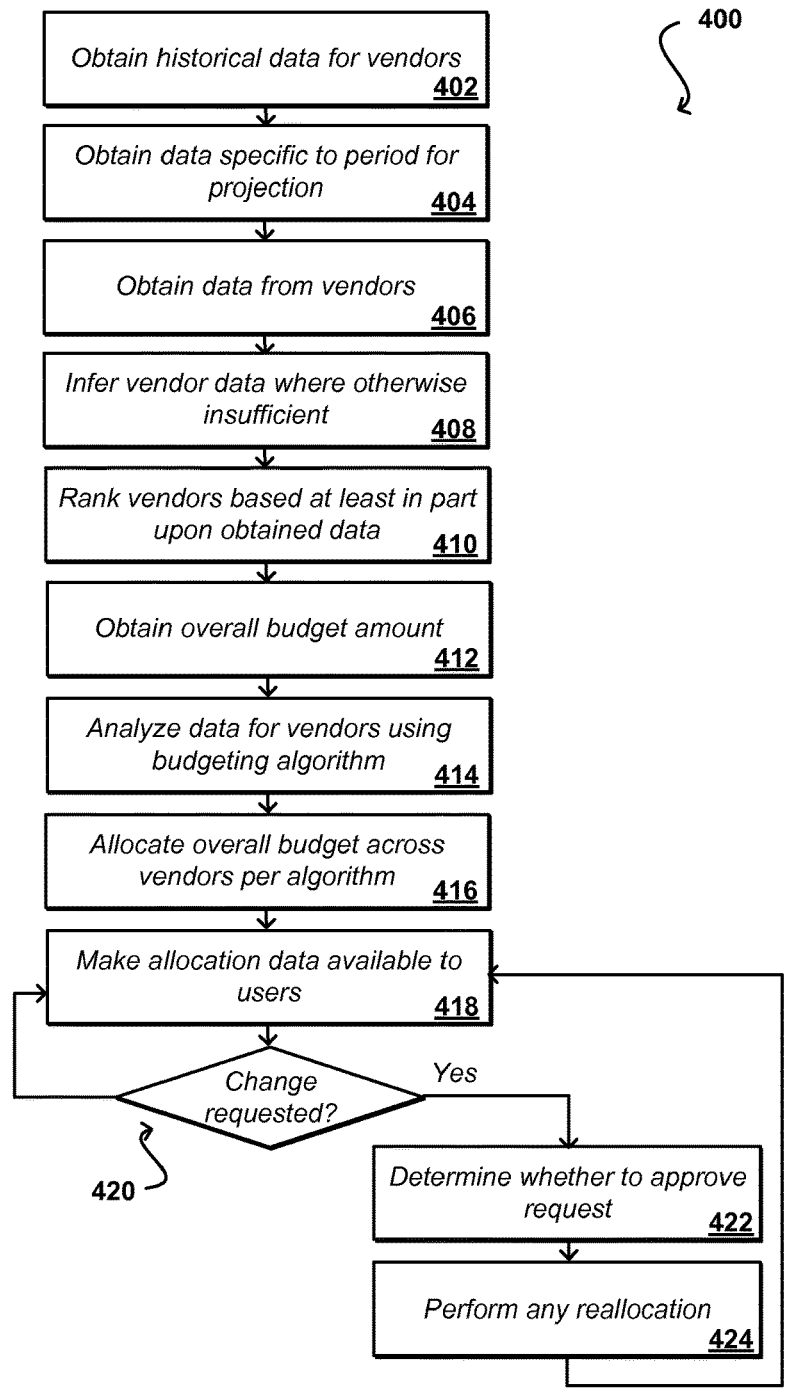
FIG. 4 illustrates an example process for providing budget allocations across vendors or other parameters that can be used in accordance with various embodiments.

FIG. 4 illustrates an example process 400 for allocating a budget across a plurality of vendors that can be used in accordance with various embodiments. It should be understood that for this and any other process discussed herein, there can be additional, fewer, or alternative steps performed in similar or alternative steps, or in parallel, within the scope of the various embodiments unless otherwise stated. In this example, historical data is obtained for at least a portion of the vendors 402, where that performance data includes information such as past profitability, return percentage, sales volume, etc. Additional data specific to the period for which the budget is to be determined can also be obtained 404, such as may contain information regarding areas of desired growth, targets for specific types of products, etc. Vendor data might also be obtained from the individual vendors 406, such as may include lines of products to be advertised, projected limits on certain items, discontinued products, etc. For vendors where there is not at least a minimum amount of historical or projection data, for example, information for similar vendors (or vendors selling similar items or items with similar customers) can be used to infer some level or type of performance or projection data for those vendors 408. Using information such as the historical, projection, and/or vendor data, the various vendors can be ranked according to any of a number of criteria 410, such as may include net income, profitability, or other such factors or weighted combinations thereof.

An overall budget can be obtained 412, either by inputting the determined budget for the upcoming season or by analyzing the historical and projection data, for example, to determine an appropriate budget. At least part of the historical, performance, vendor, and/or other information can be aggregated and analyzed using at least one budgeting algorithm 414. The algorithm in some cases might vary by period, as a summer buying season might utilize many different criteria than a winter buying algorithm, while in other embodiments the same algorithm(s) might be used for various seasons, but will analyze different periods of data corresponding to those seasons. It at least some embodiments, the budgeting algorithm analyzes the ranked order of vendors and allocates the budget across at least a portion of those vendors 416. Vendors falling below a certain ranking or not meeting a certain criterion (e.g., minimum level of profitability) might not receive any budget, while certain vendors might only receive a portion of the budget during certain periods, such as for holiday vendors.

Once the budget is allocated across the various vendors, the budget allocation information can be made available to any authorized user of the system 418, such as a plurality of finance managers each operable to access the information from a user computing device, such as a personal computer or portable smart device. If any of those users notices or determines that the allocation needs to be changed for any reason, such as where a vendor has gone out of business or where an event has caused a significant change in popularity of that vendor, the user can input and/or request changes to the allocation 420, such as to remove the allocated portion from a vendor or request an increase in the allocation for that vendor. If the request is approved 422, the budget amount can be reallocated appropriately 424. The updated allocation information then can be almost instantly made available to the authorized users, and in some cases notifications might even be pushed to users who might be affected by the changes. Any of a number of other changes can also be quickly processed and the allocations updated and available in near-real time. Various other approaches can be used as well within the scope of the various embodiments.

Such a process can help a person such as a buyer or vendor manager to be able to know how much money they have to spend, or commit to, while on site with a vendor, at a trade show, etc. Further, the budget information for a given vendor in at least some embodiments might be made available to the vendor, such that the vendor can predict the resources that will be needed to meet that demand, etc. Such information will not be sufficient for many entities, however, as there would be no way to consistently determine how to spend that allocation for specific items of product lines among the various vendors. For example, there would be no way to determine for a vendor that sells watches, jewelry, and handbags how much the buyer should spend on each category to maximize profitability or selection, for example, or meet some other retailer-imposed criteria.

Accordingly, various approaches discussed herein take advantage of an assortment planner or other such system, service, or module. As discussed above, an assortment planner can be used to allocate the budget for a vendor across the various items that the vendor sells, as well as to ensure that the items of a given type or style across the various vendors still meet various criteria. For example, if Vendor A and Vendor B sell shoes then the assortment planner would not allocate 50K to running shoes for each vendor, even if that would make sense for each individual vendor alone based on past performance, if the retailer does not want to spend more than 80K on running shoes this season. Such limits would have been difficult to ensure in conventional systems when there were different vendor managers for Vendor A and Vendor B, particularly when the vendor managers were committing to items from each vendor at substantially the same time and would have no way of knowing what the other bought until after the commitments were made, if they communicated at all. An assortment planner can be used to break down a merchandise plan into the components (e.g., styles, color, and size) that enable the buyer to address aspects such as customer preferences and needs.

Figure 5:
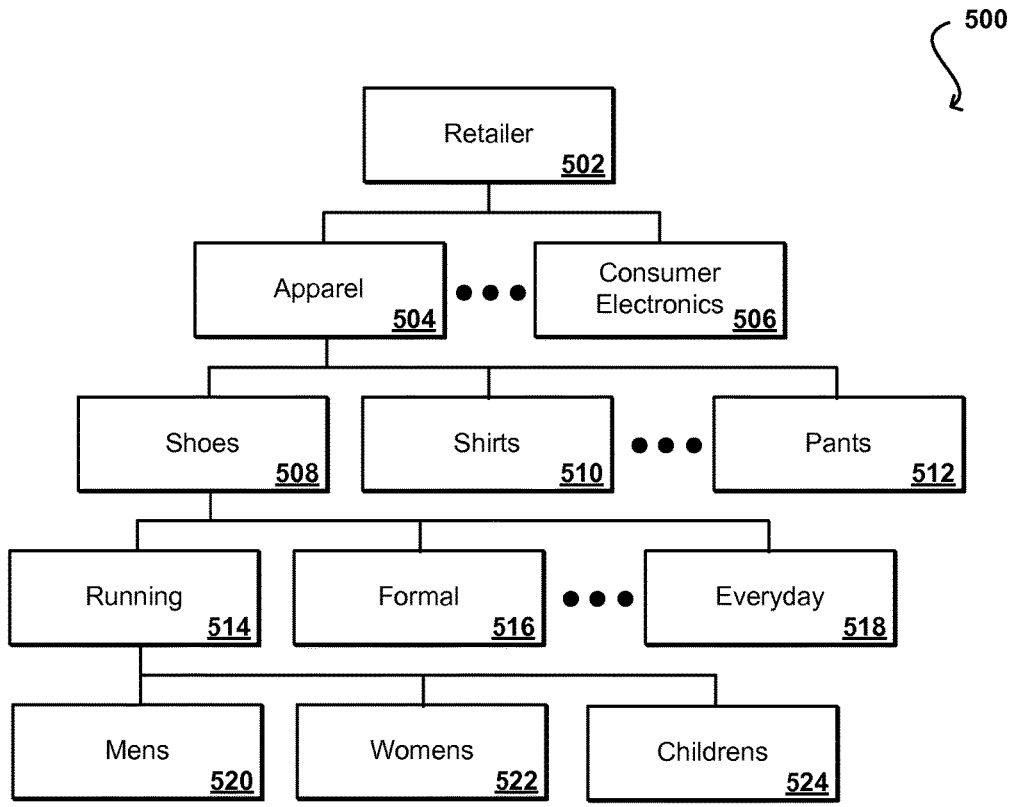
FIG. 5 illustrates an example of a hierarchy including various subcategories for which performance data can be maintained and budget allocated in accordance with various embodiments.

An assortment planner can take advantage of the fact that there are various ways in which data can be grouped, and various hierarchies in which the data can be organized, such that budget can be allocated by cross-analyzing a variety of different dimensions. For example, FIG. 5 illustrates an example item categorization tree 500 that can be analyzed in accordance with various embodiments. In this example, the retailer 502 offers items in several categories, such as apparel 504 and consumer electronics 506. For a category such as apparel, the can be many subcategories such as shoes 508, shirts 510, and pants 512, with further subcategories for shoes, for example, such as running 514, formal 516, and everyday 518. In should be understood that the tree can have any desired number of levels having any desired level of granularity. For example, the running shoes subcategory can have subcategories such as mens 520, womens 522, and childrens 524. Various other subcategories can be utilized as well, such as by size, primary color, secondary color, style, etc., while in some embodiments these will not be separate subcategories by various criteria across which budget can be allocated.

Figure 6:
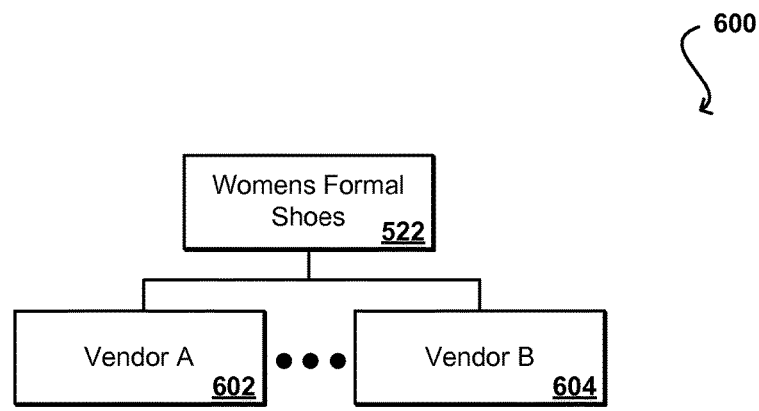
FIG. 6 illustrates an example of a sub-hierarchy that for a given node in the hierarchy of FIG. 5.

There also can be various other hierarchies as well. For example, each vendor can have a tree such as that illustrated in FIG. 5, where the tree for a given vendor will only contain nodes representing the categories in which that vendor offers items. Similarly, for each category in the retailer tree there can be a sub-tree 600 such as that illustrated in FIG. 6, illustrating the various vendors 602, 604 who offer items in that category, in this example being the women's formal shoes category 522 from FIG. 5.

While formal trees such as this might not be displayed to a user, these trees can be used to represent relationships and ways in which the budget data can be allocated and analyzed, such as to look at how budget is allocated for a given vendor, retailer, product category, style, etc. Being able to analyze information at each level of each of these trees can help to ensure that the budget is allocated across items in a consistent way that meets the various criteria of the retailer or other such entity. Further, these relationships enable the budget to be reallocated appropriately in the event of a change in an allocated amount at any level, node, etc.

Figure 7:
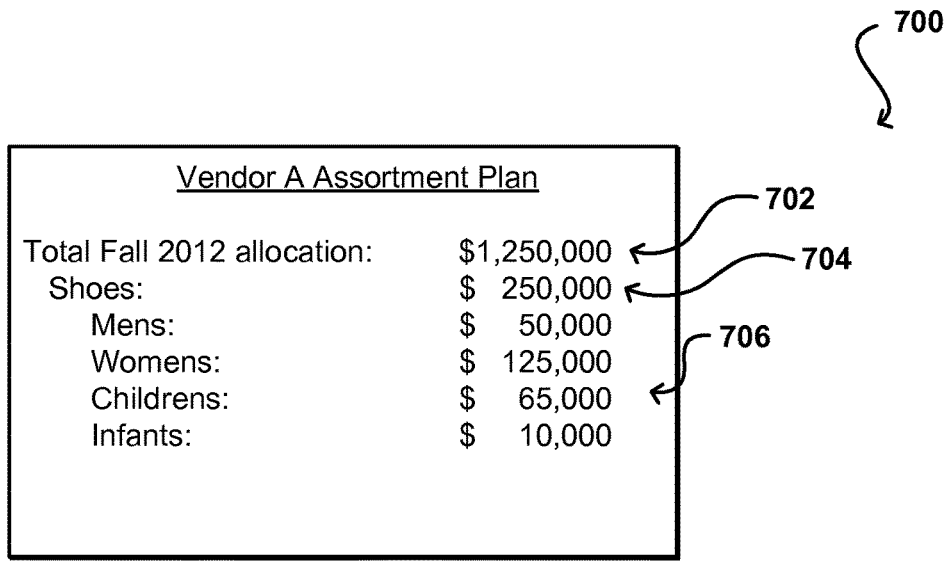
FIG. 7 illustrates an example interface illustrating how budget for a given vendor for a type of item in a given season can be allocated across various parameters in accordance with various embodiments.

For example, FIG. 7 illustrates an example of an interface page 700 that can be displayed to a user querying the system in accordance with one embodiment. The page provides the total budget amount allocated for Vendor A for a given season 702, and is drilled down to the amount allocated for shoes 704 over that period. The user can also select to view the allocation over various subcategories 706 or parameters for shoes, here able to see the allocation for mens, womens, childrens, and infants shoes. In this way, a vendor manager or buyer on location can instantly know the amount he or she has to spend with that vendor for each of a variety of types of item.

Figure 8:
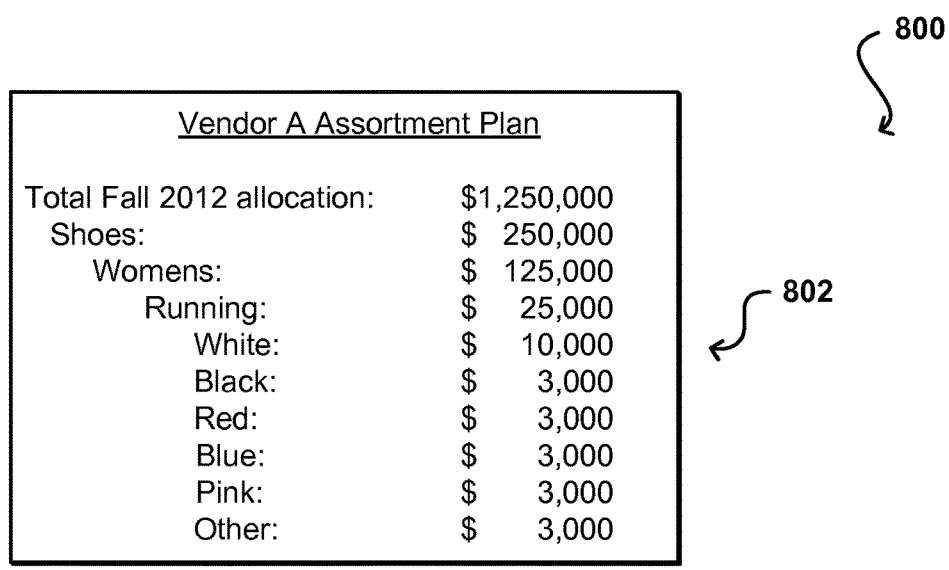
FIG. 8 illustrates an example interface illustrating how budget for a given parameter in FIG. 7 can further be allocated across particular subcategories or parameters in accordance with various embodiments.

FIG. 8 illustrates another example interface page 800 that can be used by a user in such a situation. In this example, the user is able to view more detailed information about a particular type of item, in this case women's running shoes for Vendor A. If the user is attempting to purchase running shoes, the user can determine the allocated amount for each available color 802 of running shoe. The user can run similar queries to determine allocations for various other parameters, such as size or style. As will be discussed later herein, the user can look at the items that are available and make any adjustments the user feels are appropriate. For example, if Vendor A does not have any red running shoes in this season's line, the user can request that the allocation for red running shoes be reallocated. Similarly, if Vendor A's white running shoes are particularly desirable this year, the user can request an increase in allocation for that type of item. If approved, the adjustment can be made across the various nodes, and updated budget information made available to all appropriate authorized users.

Figure 9:
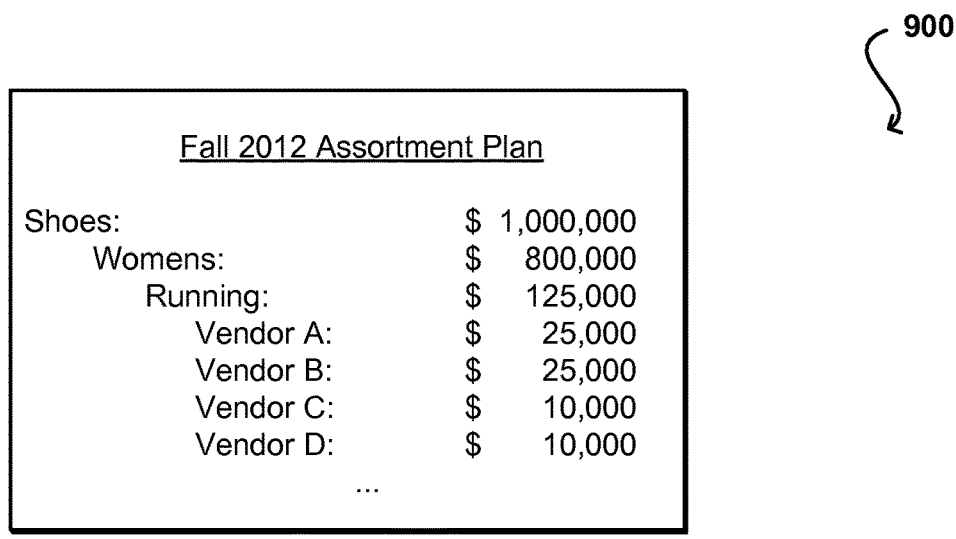
FIG. 9 illustrates an example interface illustrating how budget for a given parameter in FIG. 7 can further be allocated across various vendors in accordance with various embodiments.

In some embodiments, a vendor manager might want to see the breakdown for a particular type of item across the various vendors. FIG. 9 illustrates an example interface page 900 displaying the breakdown for women's running shoes for multiple vendors. A vendor manager might look to this information while at trade show, for example, when the vendor manager can touch and feel the actual products from each vendor. If the vendor manager thinks the running shoes from Vendor B for the upcoming season will likely not sell well, but the running shoes from Vendor C are better than expected, the vendor manager might pull up this information to determine how much budget was allocated to each vendor for this category, and suggest that a certain amount of budget from Vendor B be reallocated to Vendor C. In at least some embodiments, the request can be processed by the assortment manager and, if the change still results in acceptable results, the change (or at least a portion of the change) can be implemented and distributed as discussed elsewhere herein.

Figure 10:
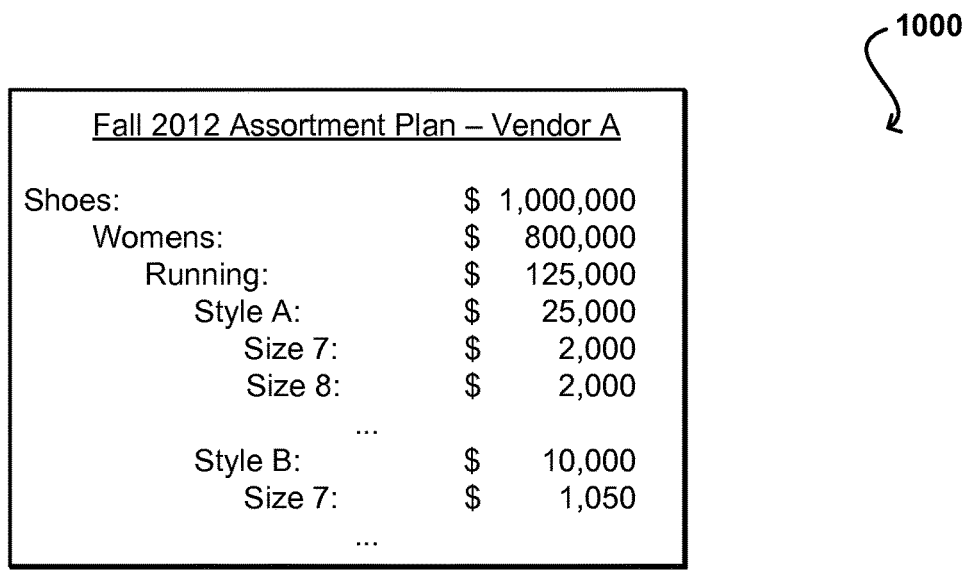
FIG. 10 illustrates an example interface illustrating how budget for a given parameter in FIG. 7 can further be allocated across combinations of parameters in accordance with various embodiments.

In some embodiments, the retailer might want to be able to provide budget constraints at a more granular level. For example, the example interface page 1000 of FIG. 10 illustrates a breakdown of the budget allocated for a particular vendor for women's running shoes, but provides a breakdown by a combination of parameters. In this example, each style of running shoe from that vendor has an allocated budget, as may be based upon past performance of running shoes with that style. Similarly, those styles can be broken down by size to at least provide buying guidelines for different sizes. For example, running shoes of a first style might sell best in sizes five to seven, while another style of running shoe might sell better in sizes six to nine. Similarly, certain styles might run a little narrow and thus might sell better in wider widths. Various other types of information can be used to breakdown the budget information for various parameters and/or combinations of parameters. Further, certain budgets might represent hard caps, while others might be recommendations. For example, a buyer might be allowed to spend up to $125,000 on shoes with Vendor A as a cap, but might be recommended by the system to spend a certain amount of that in white running shoes of a certain style that is very popular. Thus, in at least some systems the buyer can have some flexibility to exceed or adjust various recommended budgets, while still being able to see how the various styles or variations typically sell.

Figure 11A:
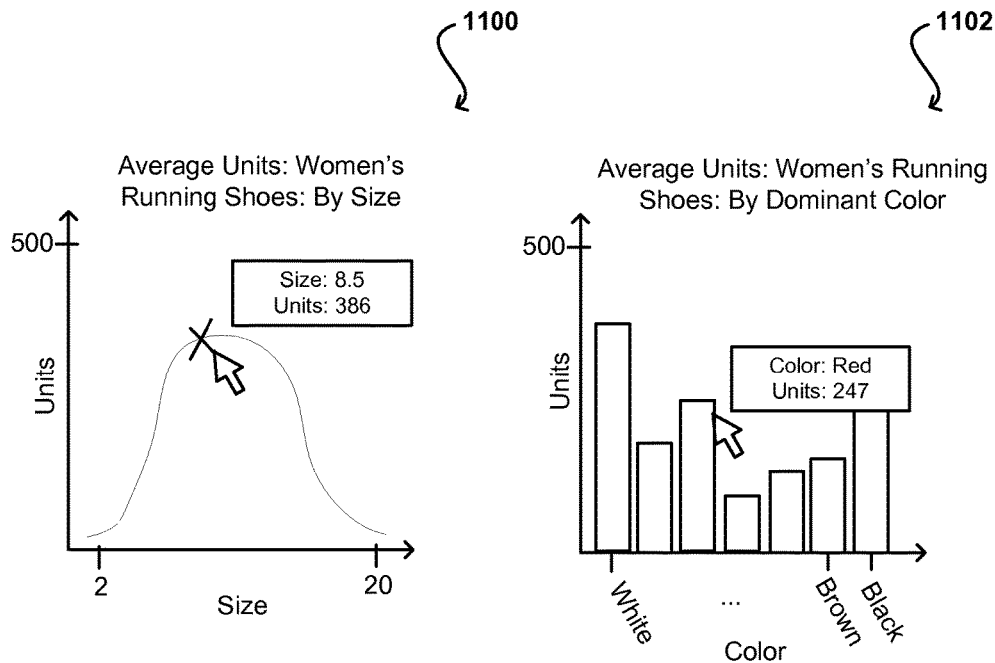
FIGS. 11(*a*) and 11(*b*) illustrate example graphs illustrating budgeting and/or allocation curves that can be used for various parameters in accordance with various embodiments.
Figure 11B:
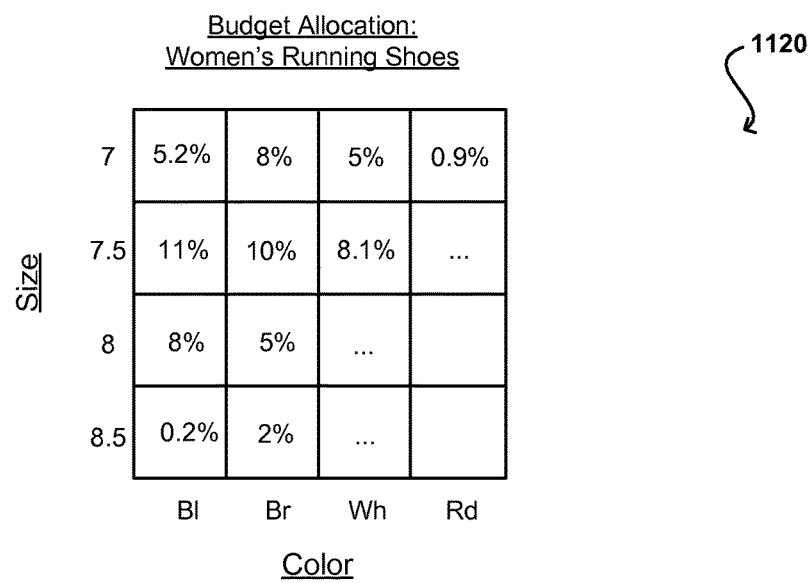

Various data and statistics can also be determined, collected, and/or maintained for such purposes. For example, FIG. 11(a) illustrates two graphs that can be used to track historical performance data, or provide projection data, for various parameters. In the first graph 1100, a user is able to view statistics showing how women's running shoes typically sell by size. Many such curves can be generated and stored for use in determining various allocations, as well as to compare a current season's performance against historical performance, etc. In some embodiments, a user can run multiple queries, such as to compare curves for different seasons, types of item, etc. Various curves such as that illustrated in FIG. 11(a) can be combined when determining how the budget to set for various combinations of parameters, such as by combining curves for various sizes, styles, and colors. The second graph 1102 illustrates an example of a bar graph that can be presented for more discrete values, such as colors or styles. A vendor can quickly view a graph such as this to quickly determine, in general, how to spend budget for a vendor without having to analyze or crunch a bunch of numbers. FIG. 11(b) illustrates another example distribution 1120 that can be utilized and/or displayed to a user in accordance with various embodiments. In this example, a user such as a vendor manager can view information for combinations of parameters. Here, a user can quickly view a distribution according to size and color, in order to obtain a quick and easy guide of how different colors sell in different sizes. Such combinations or distributions also can be utilized by the assortment planner to determine how to allocate the budget for a vendor across the various styles offered by that vendor.

Figure 12:
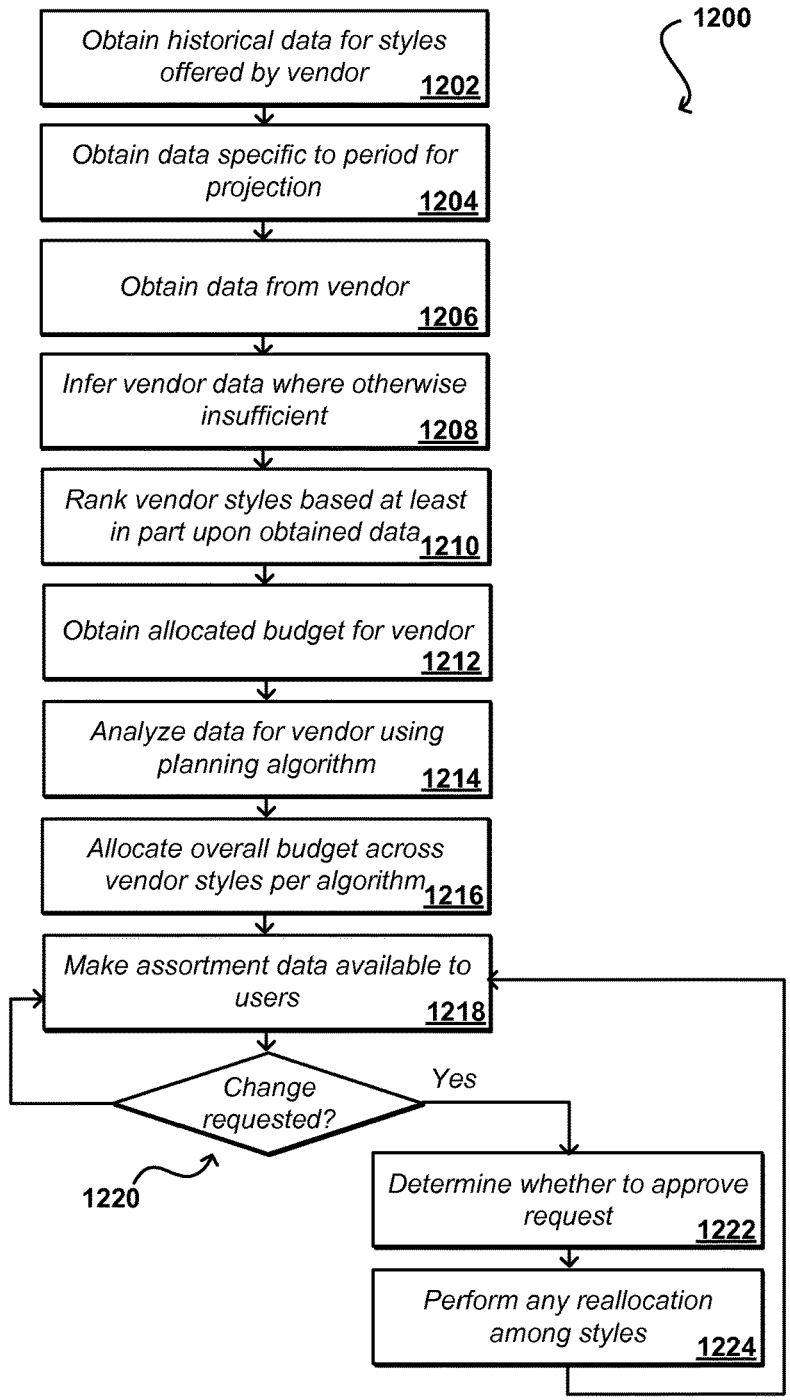
FIG. 12 illustrates an example process for providing budget allocations across various parameters that can be used in accordance with various embodiments.

FIG. 12 illustrates an example process 1200 for distributing an allocated budget for a given vendor across a plurality of styles, product lines, and other such groupings of items offered by that vendor that can be used in accordance with various embodiments. In this example, historical data is obtained for at least a portion of the items offered by the vendor 1202, where that performance data includes information such as the performance of each style for that vendor in the last relevant season, past profitability, return percentage, sales volume, etc. Additional data specific to the period for which the budget is to be determined can also be obtained 1204, such as may contain information regarding areas of desired growth, targets for specific types of products, etc., for the retailer. This can include one or more curves or optimization functions illustrating how budget can advantageously be spread across various combinations of parameters for various types of item. Vendor data might also be obtained from the particular vendor 1206, such as may include lines of products to be advertised, projected limits on certain items, discontinued products, etc. If there is not at least a minimum amount of historical or projection data for that particular vendor, for example, information for similar vendors (or vendors selling similar items or items with similar customers) can be used to infer some level or type of performance or projection data for that vendor 1208. It should be understood that the obtaining and/or inferring of various types of data can be performed in any particular order and/or concurrently from one or more sources in various embodiments. Using information such as the historical, projection, and/or vendor data, the various styles of a vendor in one or more categories can be ranked according to any of a number of criteria 1210, such as may include projected sales volume, profitability, or other such factors or weighted combinations thereof. For new styles or styles without sufficient data, data for equivalent styles can be determined and utilized for the ranking.

An allocated budget for the vendor can be obtained from the budget planner 1212. At least part of the historical, performance, vendor, and/or other information can be aggregated and analyzed using at least one assortment planning algorithm 1214. The algorithm in some cases might vary by period, as discussed above. It at least some embodiments, the budgeting algorithm analyzes the ranked order of styles and allocates the budget across at least a portion of those styles 1216. Styles falling below a certain ranking or not meeting a certain criterion (e.g., minimum level of profitability) might not receive any budget, while certain styles might only receive a portion of the budget during certain periods, such as for holiday items. Within a given style, the assortment planning algorithm can also allocate budget across various parameters or combinations of parameters, where it is desired to provide more detailed guidance as to the colors, sizes, or other such aspects and their respective profitability, sales frequency, etc.

Once the budget is allocated across the various styles, this budget allocation information can be made available to any authorized user of the system 1218, such as a plurality of vendors or vendor managers each operable to access the information from a user computing device, such as a personal computer or portable smart device. In some cases, the information might include detailed information about each style in addition to the budget, as may include pictures of a particular style, target price, etc. If any of those users notices or determines that the allocation needs to be changed for any reason, such as where a vendor has gone out of business, no longer plans to produce a certain style, or has decided to advertise a different product line, the user can input and/or request changes to the allocation 1220, such as to remove the allocated portion from a style or item or request an increase in the allocation for that style. If the request is approved 1222, the budget amount can be reallocated among the various styles, for the same vendor or among various vendors 1224. In some embodiments, the changes can be compared to one or more target curves to ensure that the new assortment plan meets one or more desired targets. The updated allocation information can be almost instantly made available to the authorized users, and in some cases notifications might even be pushed to users who might be affected by the changes. Any of a number of other changes can also be quickly processed and the allocations updated and available in near-real time. Various other approaches can be used as well within the scope of the various embodiments.

In at least some embodiments, a user such as a buyer or vendor can view a "spend curve" or similar display of information to quickly determine where money has already been spent up to the allocated amount, where there is budget left to spend, etc. For example, a buyer might be able to see that the budget has been spent for athletic gear but not for formal wear, so the buyer can move to the appropriate location in order to dedicate time where it will be most useful. Similarly, the actual spend curves for each season can be analyzed and used to generate curves for subsequent seasons, such as where the budget was not utilized for certain styles, or where additional budget was requested, etc.

In at least some embodiments, any requested change to an allocation is associated with the requesting party. This information enables the system to track the performance of each user, and in some embodiments rank or provide scores for certain users. In some embodiments, a user with a certain rating might always have his or her request approved, as long as it falls within the overall budget plan or criteria. For users with lower scores or rankings, those requests might need to be approved by at least one other user. In such cases, the requesting user might have to provide a rationale or justification for the requested change.

As discussed above, at least some of the historical data can be weighted differently among different categories in order to provide different ranking approaches as appropriate. Further, the historical data can be decayed such that more recent data is weighted more heavily in the projections that older data, to account for trends, changes in purchasing habits, etc.

In some embodiments, the management system can be configured to work with the vendor systems such that the actual ordering can be performed through the system, while in other embodiments the ordering can be done through one or more vendor systems and then input, uploaded, or otherwise transferred into the management system. Users can view the real time progress, such as to view the current spend curve versus the target spend curve, the amount spent with different vendors to date, etc.

It can also be desirable to be able to determine and track the actual fulfillment or commitment processing once the orders have been placed. For example, a retailer might want to be able to track various commitments against the respective budget, as well as to track fulfillment for individual orders, recurring orders with specific vendors, and other such commitments. In some cases, pricing or availability might change, a vendor might go out of business or discontinue a line, or any of a number of other such actions or events might occur. By being able to update and track this information in real time, the management system can make near real-time adjustments, such as to order (or allocate) more items of a particular style from a second vendor if no longer available from a first vendor, and enable vendor managers to receive notifications of any change such that the vendor manager can investigate through the system and determine any necessary actions. The ability of the management system to track accuracy and changes at every level of the process, from budgeting through assortment planning, purchasing, and fulfillment, and utilize historical information at each level for future planning, provides a robust solution that provides accurate performance information and improved budgeting that is consistent across vendors and styles and can be accessed and updated by various types of users at any time.

For example, a commitment planner can allow vendors and vendor managers, among other such users, to track existing and future commitments, as well as how past commitments have been fulfilled. Such a user can get up-to-date information by accessing the system at any time, and can build reports, export data, view statistics, or perform any of a number of other such actions. The commitments also can be reconciled periodically with the numbers from the budget planner and assortment planner to determine performance, areas for improvement, etc. This information can be used to adjust data curves, evaluate budgeting algorithms, and perform a number of other such tasks to improve future projections.

A user such as a vendor or vendor manager can access the commitment planner at any time and view information or execute queries to determine a vendor's performance, commitments against budget, and other such information. For example, FIG. 13 illustrates an example interface page 1300 wherein a user is a able to view the committed levels for various items or styles, in this case the amount allocated for various sizes of a particular size of running shoe in a particular color. The user can view the allocated budget 1302 for each size, as well as the amount actually spent 1304 and any remaining budget 1306. The user in at least some embodiments can also search for information, as will be discussed subsequently, as to whether the available budget is a result of a lower amount of money being spent for that style than was allocated, or whether there is a future or recurring purchase that will happen but is not yet reflected in the committed or utilized amount. In other embodiments, any current or future commitment can be displayed as should be apparent. A vendor manager in such a location can submit information to purchase additional items, reflect that additional items have been purchased, request additional budget, or perform any other such action. A vendor, on the other hand, might see that the retailer has not spent the entire budget for a particular style and might submit requests to the retailer to determine whether the user would like to purchase more of that item, find out if there were any concerns about the item, offer alternative items or discounts on that item, etc. Any of a number of different types of query can be executed to view information at any appropriate level, for any category or style, etc., as desired. The vendor thus can determine not only how well the vendor is performing, but can view other information as well, such as which styles the vendor prefers, which types of items the retailer's customers tend to want, which colors are most popular for a given style, etc. Thus, the vendor can focus more energy or resources on these types of items in upcoming seasons, which can be beneficial both to the vendor and the retailer. Various other such actions can be made available through the system as well.

FIG. 14 shows another example interface page 1400 whereby a user such as a vendor manager can compare the performance of various vendors, such as the vendors managed by that vendor manager. As in FIG. 13, the user can view information such as how much budget was allocated to each vendor, how much was spent with each vendor, etc. If the vendor manager sees that there is budget available that was not used for one vendor, the vendor manager can request to spend that amount with a different vendor who is performing better, has more desirable items of a particular type at the current time, etc.

A meeting between a vendor and vendor manager now can be much more productive because each can have performance and order information for that particular vendor, as well as performance data of that vendor against other vendors. If the meeting results in additional commitments, that information can be entered into the system and almost immediately available to the various users of the system. The ability to access and update information in the field can be very beneficial to any of a number of different users associated with a retailer, vendor, or other such entity.

Further, a buyer can compare the actual amount spent against the allocated budget for any given style and in real time find out how much the buyer has left for any given style, parameter, etc. The buyer can also update information about items as they are purchased, so the allocations and commitments can be updated across the system in near real time. The buyer's available budget then will be updated accordingly. If the user wants to shift allocation while in the field, the user can submit a request and, upon approval, make appropriate commitments on the spot without delay. This can be particularly when buying items such as high fashion items where there will be a limited number of items available, and any delay can result in not being able to procure those items.

The buyer also can utilize information available through the system to determine whether to spend the allocated budget for that style. For example, a vendor manager might be on site with a manufacturer looking at the quality and type of products that will be available. The vendor manager can enter information about these products for use in ranking those items. If the vendor is going to advertise certain items, thinks certain items are going to be their best sellers, etc., this information can be entered into the system as well to help with ranking the items. This information can be analyzed the following season to see how well the vendor did with their predictions, which can help to determine how much to weight that vendor's predictions for future seasons. This can help to determine not only how many items to commit to in the current season, but in future seasons as well. An advantage to the management system is that this type of information can be input at the site, uploaded beforehand, or otherwise made available at any appropriate time in any appropriate fashion. Similarly, the vendor's information can be compared against the assortment plan to determine where it might be advantageous to adjust the allocations for various styles. For example, the buyer might purchase a few items that might not perform very well, and thus might not have much budget allocated, but would help with selection and potentially drive people to view that vendor's collection. Similarly, if the buyer thinks that certain items will sell better when seeing them in person, the vendor can adjust the assortment accordingly.

Another advantage of such a management system is that the data gathering and information analysis can be done automatically, or handled through the system ahead of time, such that the relationship between the buyers and the vendor managers can be more of an actual relationship in addition to a mechanism for data transfer. Further, the retailer and vendor can be looking at the same set of data, which can help to more quickly make decisions and discuss various allocations, commitments, levels of performance, etc. In at least some embodiments, vendors, vendor managers, and other such users can leave notes and comments in the system as to why something was changed, why a request was submitted, and other such information, which can help with future determinations as well as provide useful information to various users regarding the current period.

A commitment tracker also can help to ensure that each buyer does not exceed budget for any portion of the total commitment. In some embodiments, a buyer will not be able to exceed the budget at all, while in other embodiments a buyer might need to obtain approval for an overage, or might be able to exceed the budget by a certain percentage. In some embodiments, the buyer might be able to exceed the budget but a finance manager or other such person can be notified of the overage and take appropriate action. In some embodiments the overage might be allowed as long as the buyer is under budget for other styles or items, etc. Various other approaches can be used as well as should be apparent.

In some embodiments, the commitment tracker can look at historical data to determine when various items sold well to determine a schedule at which to deliver and/or purchase those items. For example, a buyer might want to purchase 1,000 shoes but the system might determine, where allowed by the vendor, to order 50 this month, 200 for next month, etc., in order to keep lower amounts of inventory on hand and obtain the items as they will likely be needed. For soft lines in particular, setting a fixed schedule up front can help to ensure that the items are available as needed, or that the vendor makes a sufficient number of items.

Such information can be fed into a module, system, or service such as a purchase order (PO) tracker. A PO tracker can receive the information from the commitment tracker (except where the PO tracker is a portion of the commitment tracker) and use that information to generate purchase orders as needed. For example, for a current order the system can generate a purchase order and submit that purchase order, after any review, to the relevant vendor. For recurring or future orders, the system can store the necessary information and generate those purchase orders at the appropriate times. The system can then track the status of various purchase orders, and enable users to view that status at any time.

For example, FIG. 15 illustrates an example interface page 1500 wherein an authorized user is able to access open purchase orders for Vendor A. In other pages, the user can view past purchase orders or other such information. In this example, the user is able to view open or future purchase orders 1502 for Vendor A, along with various types of status information 1504, such as the commitment in the order, whether the order has been fulfilled, any outstanding amount, notes about the status, etc. The user can also be presented with various options as well, such as to cancel at least part of an order that has not been fulfilled, repeat or adjust an order, etc. This information can be made available to users in real time, with adjustments or cancellations being reflected in the data in near real time. Further, the performance data for various purchase orders can be stored and fed back into the budget and assortment planners, for example, to help determine future budget amounts to allocate over various vendors. In some embodiments, an indication from a vendor that the vendor cannot comply with a commitment can result in any of a number of actions, such as wrapping those items into a future order or redistributing the budget to other vendors, such as for similar or other items.

A PO tracker can also enable a user to specify how many of a given item to commit to purchasing, as well as how many the user might want to purchase at a future time. For example, some vendors might be willing to produce extra copies of an item if there is some indication that a vendor might want those extra copies. A vendor might indicate to a manufacturer that the vendor wants 1,000 items for sure, and if those items sell well the vendor will want 1,000 more. The manufacturer then can decide whether to manufacture those additional items based on projections, current sales, or other such factors that indicate a vendor or retailer is likely going to want the extra items. A PO tracker can also track how well various manufacturers or vendors are able to provide the extra items, and use this information to determine whether to order more up front (where it may be less likely to get additional items later) or order fewer items up front (where it is very likely to be able to replenish stock at a later time). In some embodiments, the PO tracker can be programmed to automatically order the additional items upon certain criteria being met, such as a minimum rate of sales of that item over a specified period of time.

In some embodiments, a PO and/or commitment tracker can be programmed to automatically order additional items when the stock levels of those items drop below set thresholds. For example, a retailer might want to ensure that they always have a minimum number of running shoes in stock. In some embodiments, the commitment tracker can reorder certain styles as those styles get low in stock. In other embodiments, the commitment tracker can look back to the assortment plan and order according the plan for a given type of item, such as running shoes, using the current version of that curve to order items even though some of those items might not yet have dropped below a reorder level. A tracker can be configured to work with other systems or services, such as forecasting, procurement, and inventory planning for automated PO creation and other such aspects. Various other options can be used as well in other embodiments.

Figure 16A:
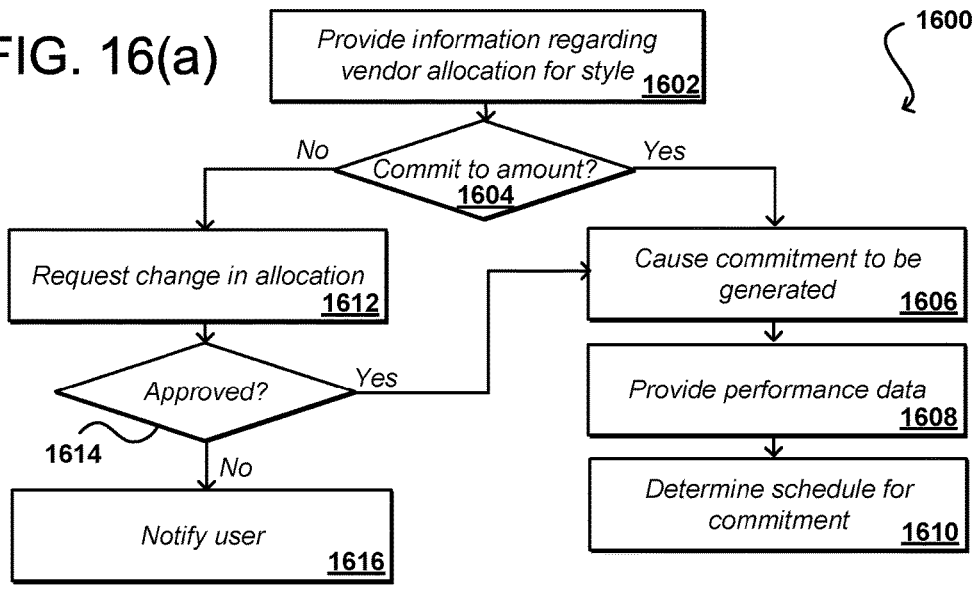
FIGS. 16(*a*) and 16(*b*) illustrate example processes for tracking commitments in accordance with various embodiments.

FIG. 16(a) illustrates a first portion 1600 of an example process for managing commitments for one or more vendors, manufacturers, or other such entities that can be used in accordance with various embodiments. Such a process can enable seamless interaction between vendors and buyers, for example, while tracking commitments reconciled against the relevant assortment plan(s). In this example, a user such as a buyer or vendor manager can access the system, whereby the system can provide information regarding the determined allocation for a given type of item, product line, style, or other such grouping for a given vendor 1602. In some embodiments, the vendor manager can access an entire buying guide for a vendor, which includes the budget amount allocated for any items or grouping of items for that vendor as set via the assortment planner. The user can look at the various items offered by that vendor while on location at a trade show, vendor site, etc., and determine whether to commit to the allocated amount 1604. If the user wants to commit to the allocated amount, the vendor manager can cause a commitment to be made for that amount of items 1606. The user can also view information such as historical performance data for the vendor, style, type of item, etc. 1608, and can specify a schedule for the purchase and delivery of those items 1610. If the user does not want to commit to the allocated amount, the user can request changes to the allocated amount for a given type of item 1612. If the request is approved 1614, the user can commit to the desired amount of items, whether the originally allocated items or other items per the request. Any updates can be made in near real time, and available to all other authorized users. As discussed above, if a user does not want to use the allocated amount for a type of item, that amount might be reallocated to items for a different vendor instead of a different item type for the same vendor. Various other options can be executed as well. If the request is denied, the user can be notified 1616, and an appropriate action can be taken, such as to go ahead with the order or not place an order, etc.

In some cases, a commitment might be unable to be fulfilled for some reason, such as where the vendor is unable to obtain materials or otherwise cannot provide a type or style of item. If that information is entered into the management system and communicated to the appropriate parties, that portion of the budget can be reallocated to other items from that vendor. In some embodiments, an assortment planner might look at the other vendors offering items of that type, and determine to reallocate that budget to another vendor offering the desired type of item. In this case, the information can be fed back to the budget planner, which can reallocate that amount of budget to the other vendor. Various information can be updated at each level as appropriate, and various users can be notified as appropriate. For example, a notification can be sent to each vendor, as well as a respective vendor manager, finance manager, etc.

Figure 16B:
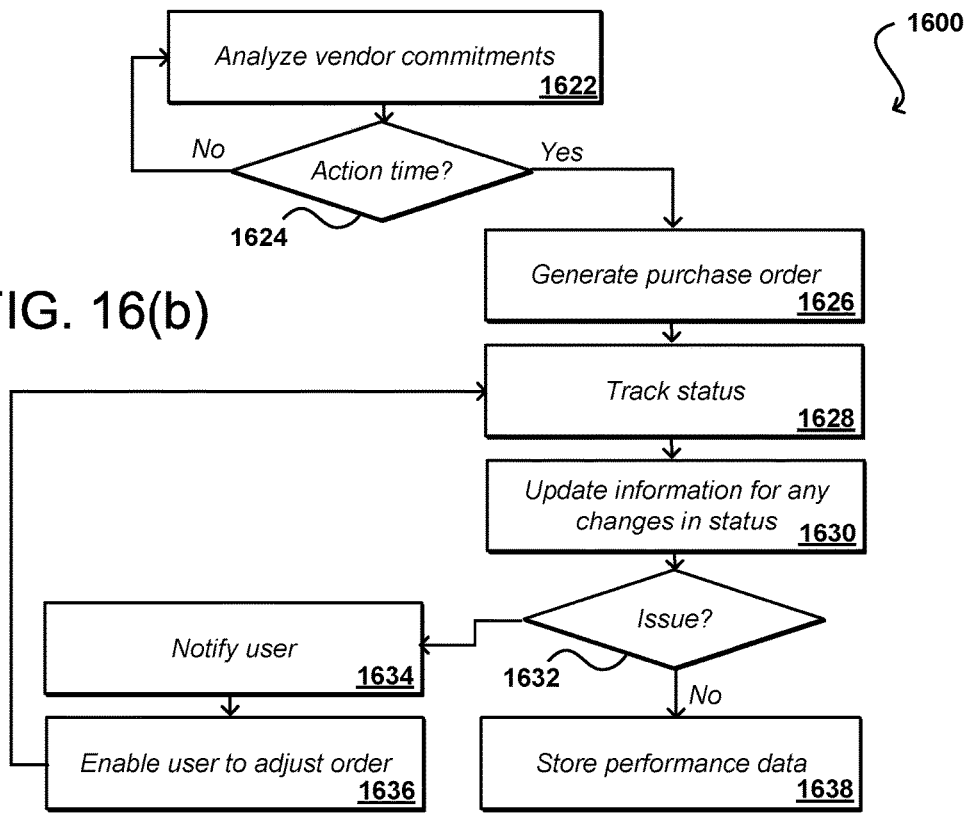

FIG. 16(b) illustrates a second portion 1620 of the example process, wherein the commitments for a given vendor can be analyzed by a commitment tracker, PO tracker, or other such module, system, or service 1622. If it is time to make a purchase per the determined timing or schedule 1624, a purchase order can be generated and issued to the vendor or other appropriate entity 1626. The system can track the status of the purchase order 1628, and can update the information with any changes 1630, such as full delivery, a partial delivery, cancellation, payment, or delay notice. For any failure to meet the terms of the purchase order 1632, the system can notify an appropriate user 1634 or in some cases automatically adjust the purchase order or perform another such action. The user can be enabled to adjust or cancel the order at any appropriate time before complete fulfillment 1636. The performance data can be stored to an appropriate location for subsequent analysis 1638, such as for future allocations for that vendor. For example, the system can store information about which products or items were actually received, how many of them, whether any had to be returned or refused, how many were late, etc. In some embodiments, the vendors can be ranked based at least in part upon this information for use in subsequent budgeting, etc. Such a system provides real-time access to commitment information and enables adjustments to be made in the field as necessary, while still maintaining consistency across users. Further, feeding the commitment and performance information back into the budget and assortment planners enables the retailer to be more accurate for subsequent seasons, periods, etc.

It should be understood, however, that while an end-to-end system can be useful in many situations, various portions of the overall system can be utilized separately in different embodiments. For example, an entity might utilize a budget planner, or subscribe to a budget planning service, to determine a projected budget for a particular season, including amounts for various vendors, manufacturers, providers, etc. Similarly, an entity might utilize an assortment planner or planning service to determine how to allocate a given budget across various types of items with any of a number of different parameters and parameter combinations. An entity also might use a commitment and/or PO planner or planning service to manage commitments for various providers, vendors, etc. Various other combinations can be used advantageously as well within the scope of various embodiments.

A commitment tracker can provide various other functionality as well. For example, the commitment tracker can kickoff an approval workflow any time a vendor manager or other user over-commits, such as for a vendor, brand, or style. The tracker can automatically aggregate budgets for a given vendor at the business group or other appropriate level, and can provide automatic reconciliation of POs and receipts against the respective commitments. The tracker can track and provide deltas between, for example, vendor manager commitments and the allocated budget for each brand, vendor, etc. The tracker can help to prevent multiple POs being sent to vendors for the same style, and can enable vendors and other such entities to interact directly with the tracker without having to contact the appropriate person(s) at the retailer, manufacturer, etc.

Figure 17:
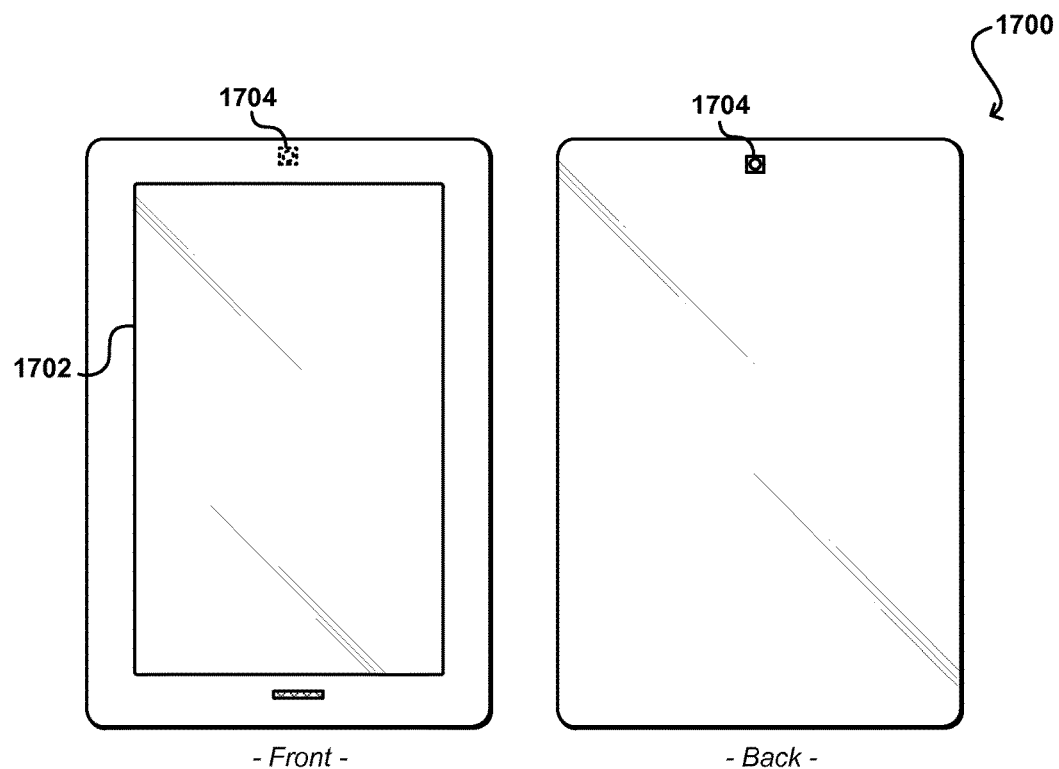
FIG. 17 illustrates an example device that can be used in accordance with various embodiments.

FIG. 17 illustrates front and back views of an example computing device 1700 that can be used in accordance with various embodiments to access and/or execute portions of the various systems or services discussed herein, or perform other such actions. Although a portable computing device (e.g., a smart phone, an electronic book reader, or tablet computer) is shown, as may be used by a vendor manager in the field, for example, it should be understood that any device capable of determining and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1700 has a display screen 1702, which under normal operation will display information to a user facing the display screen (e.g., on the same side of the computing device as the display screen). The display screen can provide for touch input in at least some cases, while other inputs can be used as well in various embodiments, such as may include keyboard or button input, mouse or keypad input, etc. The device will usually include at least one wired or wireless network connection operable to enable the device to communicate with a network, such as to obtain data from a management system as discussed herein. In at least some embodiments, the computing device can include at least one image capture element 1704 enabling the user to capture images and/or video of various products or items that can be stored to the system. The computing device can also include at least one microphone or other audio capture element capable of capturing audio data, such as verbal description information or audio generated by an item, etc. A user can use such a computing device at any appropriate location where the device can obtain an appropriate communications signal (e.g., Wi-Fi or 3G) or connection, or can work offline and upload/download information when such a connection is available.

Figure 18:
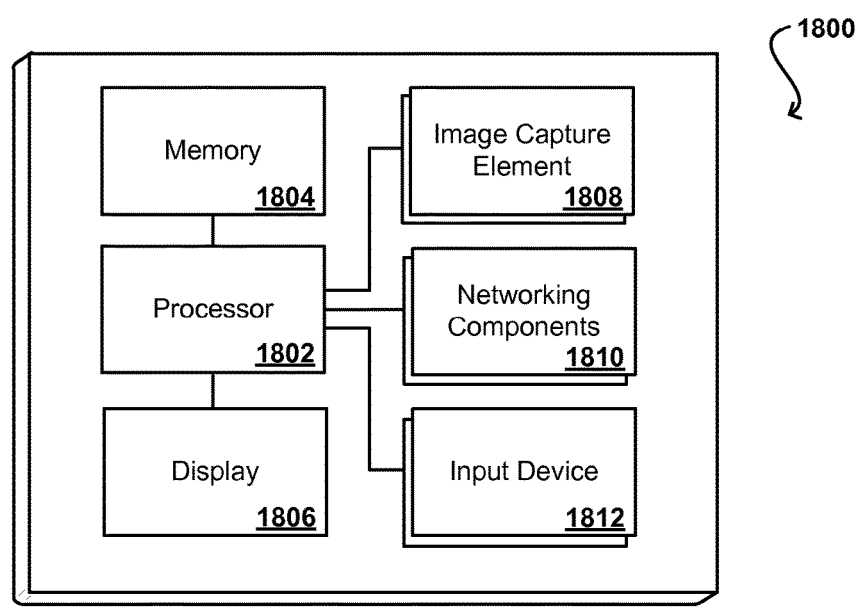
FIG. 18 illustrates components of an example device such as that illustrated in FIG. 17.

FIG. 18 illustrates an example set of basic components of a computing device 1800, such as the device 1700 described with respect to FIG. 17. In this example, the device includes at least one processor 1802 for executing instructions that can be stored in a memory device or element 1804. As would be apparent to one of ordinary skill in the art, the device can include many types of memory, data storage or computer-readable media, such as a first data storage for program instructions for execution by the processor 1802, the same or separate storage can be used for images or data, a removable memory can be available for sharing information with other devices, and any number of communication approaches can be available for sharing with other devices. The device typically will include some type of display element 1806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1808 and may also include at least one audio capture element (not shown). An image capture element can include any appropriate technology, such as a CCD image capture element having a sufficient resolution, focal range and viewable area, to capture an image of the user when the user is operating the device.

The device can include one or more networking components 1810 operable to enable the device to connect with, and transfer data over, at least one network. These components can include any appropriate components known in the art for connecting to an appropriate network, such as the Internet, a cellular or wireless network, etc. The device can also include at least one additional input device 1812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 19:
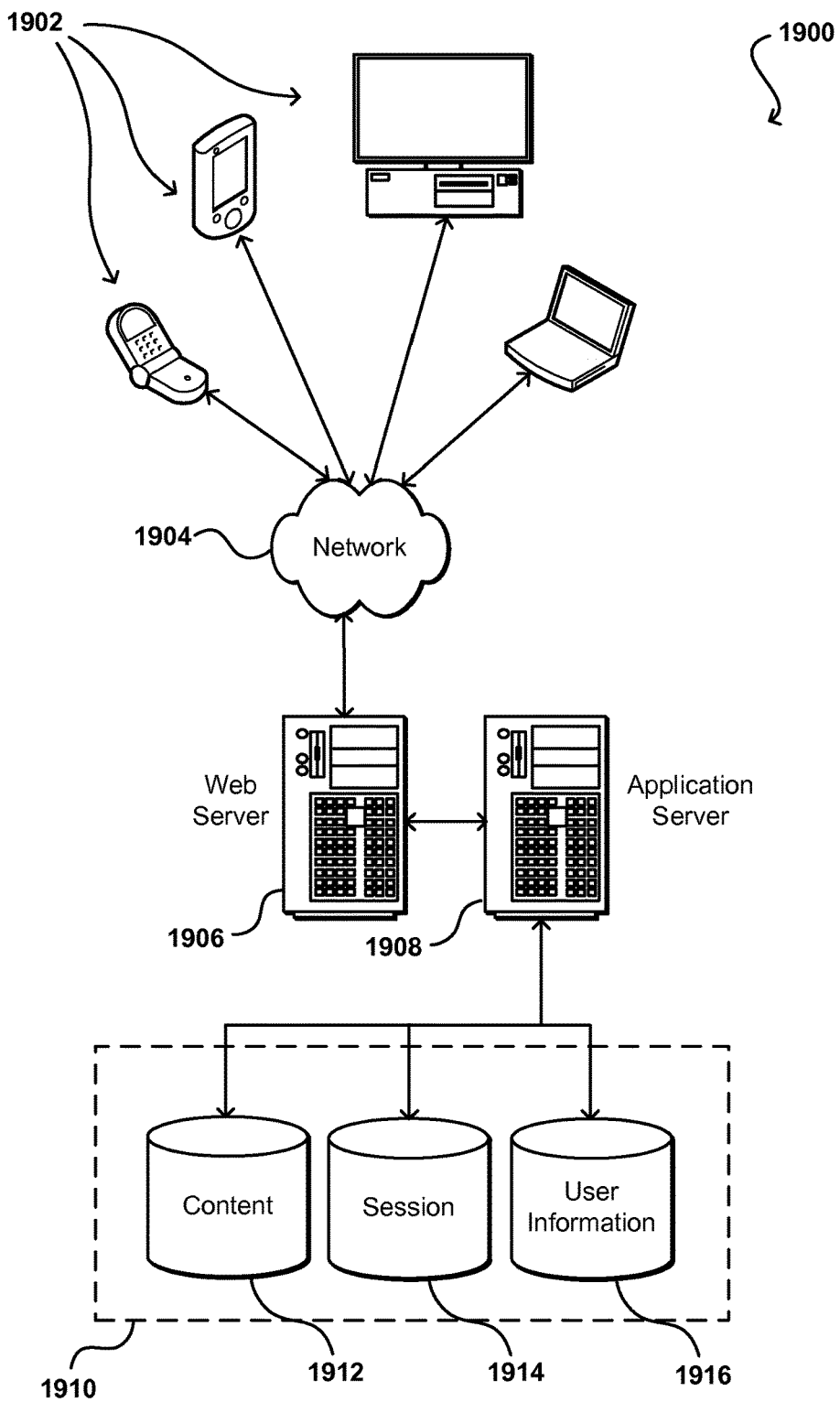
FIG. 19 illustrates an example environment in which various aspects can be practiced.

As discussed, different approaches can be implemented in various environments in accordance with the described embodiments. For example, FIG. 19 illustrates an example of an environment 1900 for implementing aspects in accordance with various embodiments. As will be appreciated, although a Web-based environment is used for purposes of explanation, different environments may be used, as appropriate, to implement various embodiments. The system includes an electronic client device 1902, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1906 for receiving requests and serving content in response thereto, although for other networks, an alternative device serving a similar purpose could be used, as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1908 can include any appropriate hardware and software for integrating with the data store 1910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1906 in the form of HTML, XML or another appropriate structured language in this example. The handling of all requests and responses, as well as the delivery of content between the client device 1902 and the application server 1908, can be handled by the Web server 1906. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing content (e.g., production data) 1912 and user information 1916, which can be used to serve content for the production side. The data store is also shown to include a mechanism for storing log or session data 1914. It should be understood that there can be many other aspects that may need to be stored in the data store, such as page image information and access rights information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle °, Microsoft Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   under control of one or more computer systems configured with executable instructions to implement a management system associated with managing a budget across a plurality of item types offered at an electronic platform of a seller and available from a provider,
   accessing, by the management system from a data store associated with the electronic platform, historical data, seller data, and provider data associated with the plurality of item types;
   ranking, by the management system, the plurality of item types in a ranked order based at least in part on two or more of the historical data, the seller data, or the provider data;
   receiving, by the management system, information about an overall purchase budget amount associated with the seller ordering the plurality of item types from the provider to facilitate offering the plurality of item types at the electronic platform;
   allocating, by the management system, a target purchase budget amount from the overall purchase budget amount to a portion of the plurality of item types according to an assortment determination algorithm implemented with the executable instructions, the assortment determination algorithm configured to allocate individual target purchase budget amounts from the overall purchase budget to respective portions of the plurality of item types based at least in part on the ranked order of the plurality of item types and a combination of parameters associated with one or more of the historical data, the seller data, or the provider data;
   providing, by the management system, access to the plurality of allocated target purchase budget amounts to a computing device of a user, the access allowing the user to request an adjustment to the plurality of target purchase budget amounts;
   automatically, by the management system, adjusting the target purchase budget amount of the portion of the plurality of item types according to the assortment determination algorithm upon approval of a request from the computing device of the user for adjusting another target purchase budget amount from the overall purchase budget amount; and
   outputting the target purchase budget as adjusted from the management system to a procurement system, the outputting causing the procurement system to generate orders for the plurality of item types based at least in part on the target purchase budget as adjusted, the orders enabling the provider to offer the plurality of item types at the electronic marketplace,
   wherein the plurality of allocated target purchase budget amounts are sent to a commitment tracker and used in generating and tracking one or more commitments by the provider, and wherein changes to the one or more commitments trigger further automatic reallocation of the target purchase budget amount.

2. The computer-implemented method of claim 1, wherein the computing device of the user comprises a portable device, wherein the portable device is configured to:
   store a portion of the historical data, the seller data, and the provider data in a local data store of the portable device; and
   request the adjustment to the plurality of target purchase budget amounts based at least in part on the local data store.

3. The computer-implemented method of claim 1, wherein the user is further able to run queries on at least one of the historical data, the provider, the plurality of item types, items corresponding to the plurality of item types, parameters, combinations of parameters or the plurality of allocated purchase budget amounts.

4. The computer-implemented method of claim 1, wherein historical data is inferred for an item type based at least in part upon similar item types when the item type does not have at least a minimum amount of historical data, the similar item types being offered by similar providers or having at least one similar parameter value.

5. The computer-implemented method of claim 1, wherein the at least a portion of the plurality of item types are ranked based at least in part upon at least one of projected performance data or vendor planning data.

6. The computer-implemented method of claim 1, wherein the target purchase budget amount is for a future period of time; and
   wherein the historical data represents at least one similar period of time in the past, and includes at least one value for at least one performance parameter including at least one of sell through, contribution margin, return rate, pure margin, average cost per unit or yearly growth.

7. The computer-implemented method of claim 1, further comprising:
   for each of the at least a portion of the plurality of item types, further allocating a corresponding allocated target purchase budget amount of the plurality of allocated target purchase budget amounts over additional item types of the plurality of item types that have different values for at least one item parameter.

8. The computer-implemented method of claim 1, wherein a request to increase or decrease an allocated target purchase budget amount for an item type of the plurality of item types causes an associated and automatic adjustment in an allocated target purchase budget amount for at least one similar item type.

9. The computer-implemented method of claim 8, wherein information regarding the automatic adjustment is sent to at least one of a budget planner or the commitment tracker and is used in at least one adjustment to information for the at least one provider.

10. The computer-implemented method of claim 1, wherein an adjustment in an allocated target purchase budget amount for an item type of the plurality of item types triggers a notification to at least one user associated with the item type.

11. The computer-implemented method of claim 1, further comprising:
   storing the plurality of allocated target purchase budget amounts for use as historical data when determining at least one future purchase budget allocation.

12. The computer-implemented method of claim 1, wherein the historical data includes data from at least one of an assortment planner, the commitment tracker, a purchase order tracker or a procurement module.

13. A system configured to manage a budget across multiple item types offered by a provider at an electronic platform of a seller, comprising:
   at least one processor; and
   at least one memory device including instructions that, when executed by the at least one processor, cause the system to, at least:
      access a data store that includes one or more of historical data, seller data, or provider data associated with the plurality of item types, the data store associated with the electronic platform;
      rank the plurality of item types in a ranked order based at least in part on the one or more of the historical data, the seller data, or the provider data;
      receive information about an overall purchase budget amount associated with the seller ordering the plurality of item types from the provider to facilitate offering the plurality of item types at the electronic platform;
      allocate a target purchase budget amount from the overall purchase budget amount of the seller to a portion of the plurality of item types according to an assortment determination algorithm, the assortment determination algorithm configured to allocate individual target purchase budget amounts from the overall purchase budget to respective portions of the plurality of item types based at least in part on the ranked order of the plurality of item types and a combination of parameters associated with one or more of the historical data, the seller data, or the provider data;
      providing access to the plurality of allocated target purchase budget amounts to a user device, the access allowing a request from the user device for an adjustment to the plurality of target purchase budget amounts;
      automatically adjust the target purchase budget of the portion of the plurality of item types according to the assortment determination algorithm upon approval of the request from the user device for adjusting another target purchase budget amount from the overall purchase budget amount; and
      output the target purchase budget as adjusted to a procurement system, the outputting causing the procurement system to generate orders for the plurality of item types based at least in part on the target purchase budget as adjusted, the orders enabling the provider to offer the plurality of item types at the electronic marketplace,
      wherein the plurality of allocated target purchase budget amounts are sent to a commitment tracker and used in generating and tracking one or more commitments by the provider, and wherein changes to the one or more commitments trigger further automatic reallocation of the target purchase budget amount.

14. The system of claim 13, wherein the target purchase budget amount is received from a budget planner operable to determine a purchase budget and allocate that purchase budget across multiple vendors.

15. The system of claim 14, wherein information regarding the automatic adjustment of the target purchase budget amount is sent to the budget planner when the reallocation affects more than one vendor.

16. A non-transitory computer-readable storage medium including instructions for managing a budget across multiple item types offered by a provider at an electronic platform of a seller, the instructions when executed by at least one processor cause the at least one processor to at least:
   obtain, from a data store associated with the electronic platform, historical data, seller data, and provider data associated with the plurality of item types;
   rank the plurality of item types in a ranked order based at least in part on two or more of the historical data, the seller data, or the provider data;
   obtain information about an overall purchase budget amount associated with the seller ordering the plurality of item types from the provider to facilitate offering the plurality of item types at the electronic platform;
   allocate a target purchase budget amount from the overall purchase budget amount to a portion of the plurality of item types according to an assortment determination algorithm, the assortment determination algorithm configured to allocate individual target purchase budget amounts from the overall purchase budget to respective portions of the plurality of item types based at least in part on the ranked order of the plurality of item types and a combination of parameters associated with one or more of the historical data, the seller data, or the provider data;
   provide access to the plurality of allocated target purchase budget amounts to a user device, the access allowing a request from the user device for one or more adjustments to the plurality of allocated purchase budget amounts;
   automatically adjust the target purchase budget amount of the portion of the plurality of item types according to the assortment determination algorithm upon approval of the request from the user device to adjust another target purchase budget amount from the overall purchase budget amount; and
   output the target purchase budget as adjusted to a procurement system, the outputting causing the procurement system to generate orders for the plurality of item types based at least in part on the target purchase budget as adjusted, the orders enabling the provider to offer the plurality of item types at the electronic marketplace,
   wherein the plurality of allocated target purchase budget amounts are sent to a commitment tracker and used in generating and tracking one or more commitments by the provider, and wherein changes to the one or more commitments trigger further automatic reallocation of the target purchase budget amount.

17. The computer-readable storage medium of claim 16, wherein the instructions, when executed by the at least one processor, further cause the at least one processor to rank the portion of the plurality of item types based at least in part upon at least one of projected performance data or vendor planning data.

18. The computer-readable storage medium of claim 16, wherein a request to increase or decrease an allocated target purchase budget amount for an item type of the plurality of item types causes an associated and automatic adjustment in an allocated target purchase budget amount for at least one similar item type.

19. The computer-readable storage medium of claim 16, wherein:
- ranking the plurality of item types is based at least in part on weighted combinations of factors associated with the historical data, the seller data, and the provider data,
- the assortment determination algorithm is configured to remove target budget amounts to particular portions of the plurality of item types that rank lower than a threshold,
- the assortment determination algorithm is configured to allocate target budget amounts to remaining portions of the plurality of item types based at least in part on weighted combinations of factors associated with the ranked order, the historical data, seller data, and provider data,
- the user is associated with the seller,
- the request is approved based at least in part on tracked performance data of the user, and
- adjusting the target budget amount comprises sending notifications about the adjusting to the computing device of the user and to a computing device of the provider.

* * * * *